(12) United States Patent
Semple et al.

(10) Patent No.: US 11,264,785 B2
(45) Date of Patent: Mar. 1, 2022

(54) QUICK CONNECT

(71) Applicant: EATON INTELLIGENT POWER LIMITED, Dublin (IE)

(72) Inventors: Shane Semple, Cecil, PA (US); Ronald Conroy, Liverpool, NY (US); Joseph Platt, Baldwinsville, NY (US); Prince Kumar Pandey, Bihar (IN); Himanshu G. Khokle, Maharashtra (IN); Gangadhar Mestri, Karnataka (IN)

(73) Assignee: Eaton Intelligent Power Limited, Dublin (IE)

(*) Notice: Subject to any disclaimer, the term of this patent is extended or adjusted under 35 U.S.C. 154(b) by 0 days.

(21) Appl. No.: 17/150,053

(22) Filed: Jan. 15, 2021

(65) Prior Publication Data

US 2021/0135439 A1 May 6, 2021

Related U.S. Application Data

(60) Continuation of application No. 16/939,185, filed on Jul. 27, 2020, now Pat. No. 10,910,803, which is a division of application No. 16/563,305, filed on Sep. 6, 2019, now Pat. No. 10,742,011.

(60) Provisional application No. 62/807,132, filed on Feb. 18, 2019, provisional application No. 62/807,147, (Continued)

(51) Int. Cl.
| | | |
|---|---|---|
| H02G 3/08 | (2006.01) | |
| H02G 3/12 | (2006.01) | |
| H02G 15/16 | (2006.01) | |
| F16B 2/20 | (2006.01) | |
| F16M 13/02 | (2006.01) | |

(Continued)

(52) U.S. Cl.
CPC .............. *H02G 3/12* (2013.01); *F16B 2/20* (2013.01); *F16M 13/02* (2013.01); *H02G 3/0691* (2013.01); *H02G 3/083* (2013.01); *H02G 3/126* (2013.01); *H02G 3/18* (2013.01); *H02G 15/16* (2013.01)

(58) Field of Classification Search
CPC ......... H02G 3/085; H02G 3/126; H02G 3/12; H02G 3/083; H02G 3/18; H02G 3/0691; H02G 15/16
USPC ....................................................... 174/541
See application file for complete search history.

(56) References Cited

U.S. PATENT DOCUMENTS

| | | | |
|---|---|---|---|
| 3,004,238 A * | 10/1961 | Damon | ................ H01R 13/743 439/748 |
| 3,730,464 A | 5/1973 | Kelly | |
| 3,751,579 A | 8/1973 | Nojiri | |

(Continued)

*Primary Examiner* — Sherman Ng
(74) *Attorney, Agent, or Firm* — Squire Patton Boggs US LLP

(57) ABSTRACT

An electrical connection assembly includes an electrical box including a housing having an internal surface defining an internal volume of the housing. An electrical connector is positioned outside the internal volume of the housing and fixed to the housing with a fastener. The housing includes an aperture having an opening defining an insertion path extending from a location external to the housing along a frame of the electrical connector to a location within the internal volume of the housing. The assembly includes a disc mechanically secured to the housing relative to the opening to obstruct the insertion path. A retainer and a bushing including a membrane for the electrical connector as well as methods of making an electrical connector are also provided.

9 Claims, 17 Drawing Sheets

Related U.S. Application Data filed on Feb. 18, 2019, provisional application No. 62/727,786, filed on Sep. 6, 2018.

(51) Int. Cl.
*H02G 3/06* (2006.01)
*H02G 3/18* (2006.01)

(56) References Cited

U.S. PATENT DOCUMENTS

| | | | |
|---|---|---|---|
| 3,991,446 A | 11/1976 | Mooney | |
| 4,103,101 A * | 7/1978 | Maier | H02G 3/0691 174/660 |
| 4,378,103 A * | 3/1983 | Sanford | B29C 33/0033 249/145 |
| 4,447,030 A | 5/1984 | Nattel | |
| 5,132,493 A * | 7/1992 | Sheehan | H02G 3/06 174/655 |
| 5,789,706 A | 8/1998 | Perkins | |
| 6,100,470 A | 8/2000 | Gretz | |
| 6,194,661 B1 | 2/2001 | Gretz | |
| 6,209,836 B1 | 4/2001 | Swanson | |
| 6,290,518 B1 | 9/2001 | Byrne | |
| 6,352,439 B1 | 3/2002 | Stark et al. | |
| 6,389,658 B1 | 5/2002 | Pfaller et al. | |
| 6,538,201 B1 | 3/2003 | Gretz | |
| 6,596,939 B1 | 7/2003 | Gretz | |
| 6,737,584 B2 | 5/2004 | Kiely | |
| 6,749,162 B2 | 6/2004 | Nicolides et al. | |
| 6,753,472 B2 | 6/2004 | Ito | |
| 6,768,057 B2 | 7/2004 | Blake | |
| 6,777,611 B2 | 8/2004 | Ewald et al. | |
| 6,780,049 B1 | 8/2004 | D'Angelo et al. | |
| 6,827,604 B1 | 12/2004 | White | |
| 6,849,803 B1 | 2/2005 | Gretz | |
| 6,894,222 B2 | 5/2005 | Lalancette et al. | |
| 6,956,172 B2 | 10/2005 | Dinh | |
| 6,996,943 B2 | 2/2006 | Denier et al. | |
| 7,053,300 B2 | 5/2006 | Denier et al. | |
| 7,060,900 B1 | 6/2006 | Gretz | |
| 7,073,757 B2 | 7/2006 | Johnson et al. | |
| 7,154,040 B1 | 12/2006 | Tompkins | |
| 7,179,995 B2 | 2/2007 | Dinh | |
| 7,208,680 B2 | 4/2007 | Drane | |
| 7,214,876 B1 | 5/2007 | Haberek | |
| 7,360,745 B2 | 4/2008 | Nikayin et al. | |
| 7,388,150 B2 | 6/2008 | Dinh et al. | |
| 7,390,979 B1 | 6/2008 | Johnson | |
| 7,390,980 B1 | 6/2008 | Gretz | |
| 7,432,452 B2 | 10/2008 | Gardner | |
| 7,439,443 B2 | 10/2008 | Dinh | |
| 7,476,817 B1 | 1/2009 | Shemtov et al. | |
| 7,518,059 B2 | 4/2009 | Herth | |
| 7,549,549 B1 | 6/2009 | Kiely | |
| 7,628,286 B2 | 12/2009 | Lalancette | |
| 7,635,816 B1 * | 12/2009 | Shemtov | H02G 3/0666 16/2.2 |
| D612,226 S | 3/2010 | Dinh | |
| 7,718,893 B2 | 5/2010 | Purves et al. | |
| 7,824,213 B1 | 11/2010 | Korcz et al. | |
| 7,914,326 B2 | 3/2011 | Sutter | |
| 7,915,545 B1 | 3/2011 | Bixler et al. | |
| 7,923,635 B2 | 4/2011 | Korcz et al. | |
| 7,952,034 B2 | 5/2011 | Kiely et al. | |
| 7,956,285 B2 | 6/2011 | Tally et al. | |
| 7,997,549 B2 | 8/2011 | Hopkins | |
| 8,042,776 B2 | 10/2011 | Johnson | |
| 8,403,289 B1 | 3/2013 | Rinderer | |
| 8,466,378 B1 | 6/2013 | Gretz | |
| 8,598,454 B2 | 12/2013 | Laughlin | |
| 8,657,626 B2 | 2/2014 | Duval et al. | |
| 8,680,394 B2 | 3/2014 | Korcz et al. | |
| 8,710,367 B2 | 4/2014 | Korcz et al. | |
| 8,791,374 B1 | 7/2014 | Smith | |
| 8,870,135 B2 | 10/2014 | Grubbs | |
| 8,901,441 B2 | 12/2014 | Sathyanarayana et al. | |
| 9,231,388 B2 | 1/2016 | Chavan et al. | |
| 9,252,579 B2 | 2/2016 | Korcz et al. | |
| 9,337,635 B2 | 5/2016 | Korcz et al. | |
| 9,397,491 B2 | 7/2016 | Birli et al. | |
| 9,559,502 B2 | 1/2017 | Korcz et al. | |
| 9,559,506 B2 | 1/2017 | Korcz et al. | |
| 9,762,042 B2 | 9/2017 | Korcz et al. | |
| 9,825,446 B2 | 11/2017 | Korcz et al. | |
| 9,853,431 B2 | 12/2017 | Jones | |
| 9,853,437 B2 | 12/2017 | Coyle | |
| D821,849 S | 7/2018 | Nikayin et al. | |
| 10,050,427 B2 | 8/2018 | Korcz et al. | |
| 10,084,296 B2 | 9/2018 | Korcz et al. | |
| 10,135,232 B2 | 11/2018 | Nikayin et al. | |
| 2005/0067541 A1 | 3/2005 | Dinh et al. | |
| 2008/0029287 A1 * | 2/2008 | Korcz | H02G 3/126 174/58 |
| 2008/0073100 A1 | 3/2008 | Magisano et al. | |
| 2009/0111337 A1 | 4/2009 | Kiely | |
| 2009/0199505 A1 | 8/2009 | Loehlein | |
| 2010/0181447 A1 | 7/2010 | Gretz | |
| 2010/0282933 A1 | 11/2010 | Phillips | |
| 2012/0024409 A1 | 2/2012 | Kunzmann | |
| 2016/0056551 A1 * | 2/2016 | Mostoller | H01R 13/44 439/131 |
| 2016/0099555 A1 | 4/2016 | Nikayin et al. | |
| 2016/0306125 A1 * | 10/2016 | Wu | G02B 6/3885 |
| 2017/0125991 A1 * | 5/2017 | Korcz | H02G 3/16 |
| 2017/0256928 A1 | 9/2017 | Korcz et al. | |
| 2017/0331220 A1 * | 11/2017 | Sebasti N Mart N | H01R 13/6683 |

\* cited by examiner

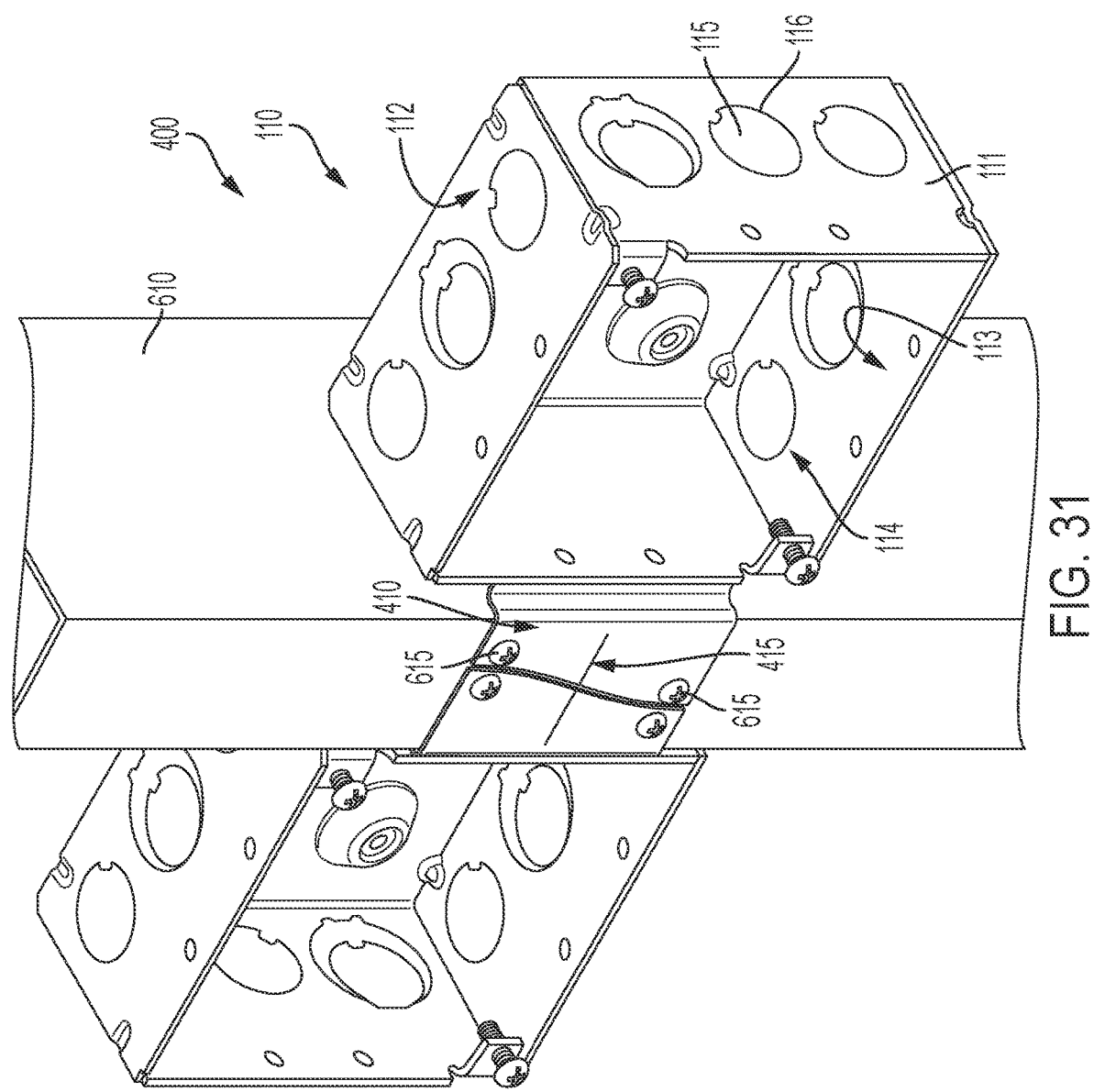

QUICK CONNECT

This application is a continuation of U.S. patent application Ser. No. 16/939,185, filed Jul. 27, 2020, which is a divisional of U.S. patent application Ser. No. 16/563,305, filed Sep. 6, 2019 and issued as U.S. Pat. No. 10,742,011 on Aug. 11, 2020, which claims the benefit of priority of the following applications: U.S. Provisional Patent Application 62/727,786, filed Sep. 6, 2018, U.S. Provisional Patent Application 62/807,132, filed Feb. 18, 2019, and U.S. Provisional Patent Application 62/807,147, filed Feb. 18, 2019, each of which is incorporated herein by reference in its entirety.

FIELD OF INVENTION

The present disclosure relates to connectors and brackets. More specifically, the present disclosure relates to connectors and stud mount brackets for electrical boxes.

BACKGROUND

Electric power can be supplied from an active device (e.g., power source) to a passive device (e.g., load source). For example, power stations can generate electric power; electric power companies can supply the electric power through an electric circuit (e.g., electric power grid) to consumers; and consumers can employ one or more devices to convert the electric power into energy to accomplish a variety of objectives. Consumers of electricity include household and residential consumers as well as commercial and industrial consumers.

Electrical boxes house a variety of electrical components electrically connected to an electrical current by an electrical wire carrying an electric current. A variety of electrical wiring and a variety of electrical components may be selected and electrically connected for use in a variety of applications. Electrical connectors are connected with electrical boxes to facilitate and support the variety of wiring and electrical components. Accordingly, for safe and effective distribution of electric power, connectors for electrical boxes and electrical boxes with connectors are needed.

SUMMARY

In one embodiment, an electrical connection assembly includes an electrical box including a housing having an internal surface defining an internal volume of the housing, an electrical connector positioned outside the internal volume of the housing and fixed to the housing with a fastener, the housing including a side wall including a pair of apertures having a pair of openings defining respective insertion paths extending from a location external to the housing along a frame of the electrical connector to a location within the internal volume of the housing, and a plug having a flange portion and a plurality of resilient legs extending from the flange portion, the plug being positioned relative to at least one opening of the pair of openings to obstruct the respective insertion path.

In another embodiment, an electrical connection assembly includes an electrical connector, a retainer coupled to a frame of the electrical connector, a bushing positioned at least partially within the retainer, and a plug positioned in an opening of the bushing, wherein the plug has a flange portion and a plurality of resilient legs extending from the flange portion.

In yet another embodiment, a method of installing an electrical assembly including an electrical box including a housing having an internal surface defining an internal volume of the housing and an electrical connector positioned outside the internal volume of the housing and fixed to the housing with a fastener, includes contacting a plug having a flange portion and a plurality of resilient legs extending from the flange portion; and removing the plug from an opening of a bushing positioned at least partially within a retainer coupled to a frame of the electrical connector.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 31 is an illustration of a perspective view of the electrical box of FIG. 1 mounted to a stud with the bracket of FIG. 29.

DETAILED DESCRIPTION

Figure 1:
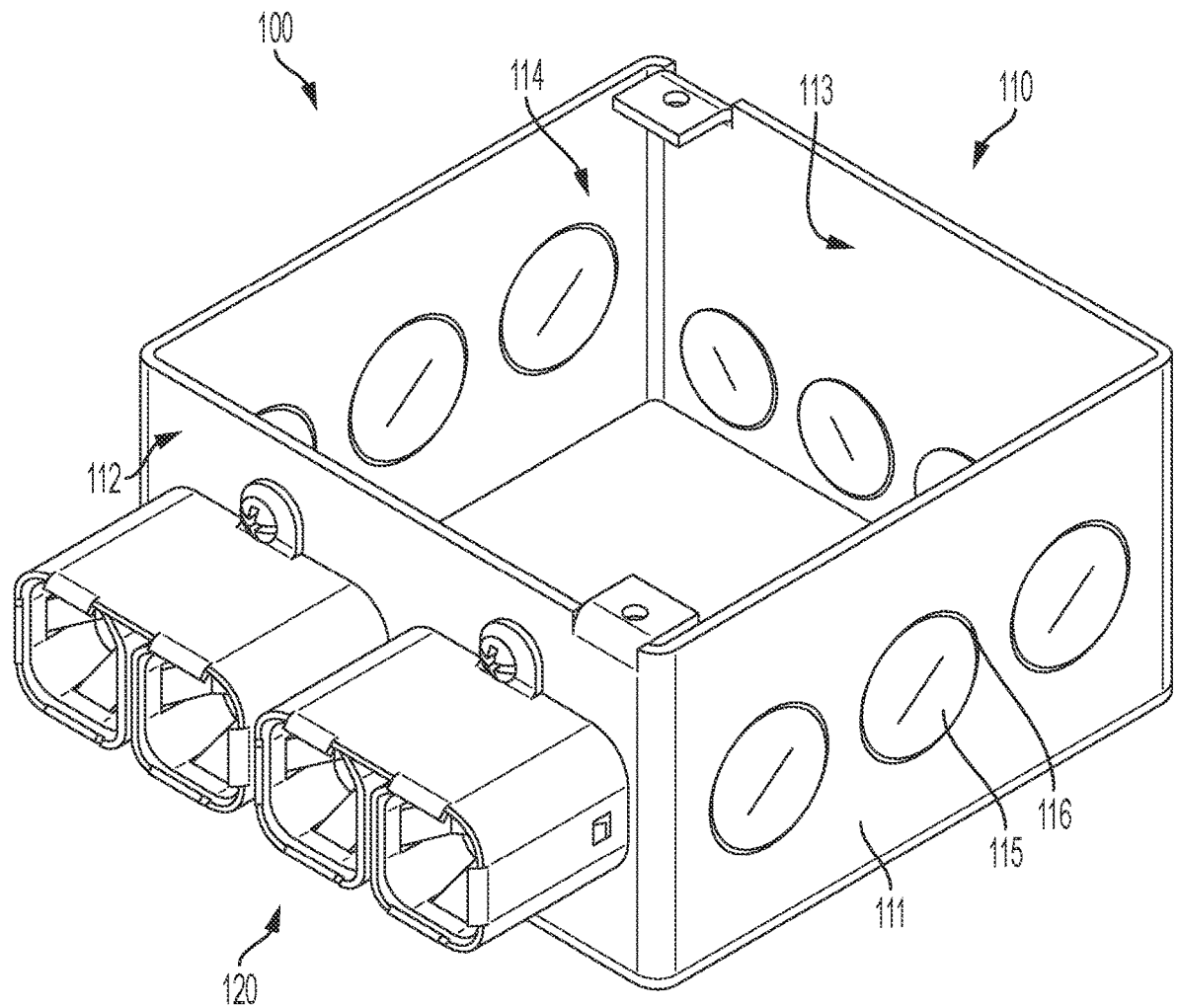
FIG. 1 is a schematic illustration of a perspective view of an electrical connection assembly including an electrical box and an electrical connector in accordance with embodiments of the disclosure.

FIG. 1 is a schematic illustration of a perspective view of an electrical connection assembly 100 including an electrical box 110 and an electrical connector 120. The electrical box 110 and electrical connector 120 provide a structure having junction points to mechanically and electrically connect one or more devices (not shown) with an electrical current supplied to or from the electrical box 110 (e.g., via an electrical wire, not shown). For example, the electrical box 110 and electrical connector 120 can join electronic devices (e.g., panels with devices having decision making capability defining a closed loop system), electrical devices (e.g., panels without decision making capability), and electromechanical devices (e.g., motor load) with an electrical current supplied to or from the electrical box 110. The electrical box 110 and electrical connector 120 can also serve as a junction box joining one or more electrical wires.

The electrical box 110 and electrical connector 120 can be employed in a variety of locations where electrical distribution is desired including factories, commercial buildings, and industrial facilities. Additionally, the electrical box 110 and electrical connector 120 can be employed indoors or outdoors and can be provided for permanent installation (e.g., in a building) or for temporary installation (e.g., at a construction site). Unless otherwise noted, the electronic connection assembly 100 of the present disclosure including the electrical box 110 and the electrical connector 120 can be employed in a variety of applications for electrical distribution and control including residential and commercial applications with a variety of electronic devices (e.g., panels with devices having decision making capability defining a closed loop system), electrical devices (e.g., panels without decision making capability), and electromechanical devices (e.g., motor load).

Throughout the disclosure, the electrical box 110 and electrical connector 120 are schematically illustrated with the understanding that a variety of electrical components (e.g., wires, capacitors, inductors, transformers, reducers, amplifiers, fuses, switches, connectors, detectors, sensors, transducers, resonators, semiconductors, cables, timers, tubes, suppressors, terminals, etc.) oriented to provide one or more operations or functions with respect to distribution and control of electric power to an/or from the electrical box 110 and the electrical connector 120, for example, between one or more active devices and one or more passive devices, can be provided in further embodiments without departing from the scope of the disclosure.

The electrical box 110 includes a housing 111 having an outer surface 112 and an inner surface 113. The inner surface defines an internal volume 114 of the housing 111. In some embodiments, a cover (not shown) can be provided to isolate the internal volume 114 from an external environment in which the electrical box 110 may be employed. For example, in some embodiments, the housing 110 can define an enclosure including the internal volume 114 in which one or more electrical components (switches, dimmers, controllers, electrical junctions, not shown) can be contained. The housing 111 can be manufactured from a metallic, plastic, polymeric or other suitable material oriented to protect the electrical components from a variety of external forces, elements, and contact. Moreover, the electrical box 110 can be provided in a variety of shapes (e.g., rectangular, cuboidal, polyhedron, etc.) and sizes (e.g., small, medium, large) without departing from the scope of the disclosure.

The electrical box 110 can include one or more apertures 116 oriented to provide access into the internal volume 114 of the housing 114. While three apertures 116 per side of the housing 111 are shown in the illustrated embodiment of FIG. 1, in further embodiments, one aperture or a plurality of apertures can be provided. A disc 115 (e.g., knock-out) can be positioned to obstruct the aperture 116, thereby restricting or preventing access into the internal volume 114 of the housing 111. The disc 115 can be attached to the housing 111 with a fastened connection, a threaded connection, or other temporary or removable link that can maintain the disc 115 in position relative to the housing 111 obstructing the aperture 116 until the link is broken, and access through the aperture 116 is enabled. Typically, a technician (e.g., electrician, maintenance worker, engineer) can remove (e.g., hit, pry, bend, tap, contact) the disc 115 with a tool (e.g., screwdriver, mechanical tool, hand, finger) to provide access into the interior volume 114 of the housing 111 through the aperture 116. After removing the disc 115, the technician may dispose of the disc 115 as it may no longer provide utility with respect to the electrical box 110.

Further, after removing the disc 115, the technician can then connect a connector (not shown) to the housing 111 to facilitate placement of one or more electrical wires or cables (not shown) into the aperture 116. The connector (not shown) can support the electrical wire and retain the electrical wire within and connected to the electrical box 110 while electrical current is provided to the one or more electrical components housed in the electrical box 110. The process of removing the disc 115, attaching a connector (not shown) to the electrical box 110, and then placing the electrical wire, can be time consuming and cumbersome when performed in a variety of environments and when repeated multiple times. Moreover, certain electrical codes may dictate that any apertures 116 from which the disc 115 has been removed and through which a wire was not subsequently placed, are to be blocked or plugged, thus adding yet another step and additional inconvenience to the technician.

Optionally, the disc 115 can be removed from the aperture 116 and a connector (not shown) can be secured to the aperture 116 (e.g., threaded engagement, snap-fit) upon manufacture of the electrical box 110. For example, known connectors (not shown) connected to the electrical box by way of removal of the disc 115 and mechanical connection to the aperture 116. In other words, to connect known connectors to the electrical box, the disc 115 must be removed to expose the aperture 116. The electrical box 110 and attached connector can then be supplied to the technician as an assembled unit. While such an approach reduces the number of initial steps a technician may take to place a wire, as noted, certain electrical codes may dictate that any apertures 116 from which the disc 115 has been removed and through which a wire was not subsequently placed, are to be blocked or plugged. Thus, to the extent one or more discs 115 are removed such that known connectors (not shown) can be attached to the electrical box 110, unless a wire is place through the exposed aperture 116, the technician would still be required to block or plug the unused aperture 116, again, adding yet another step and additional inconvenience to the technician.

In addition or alternatively, one or more connectors (not shown) may be provided inside the housing 111 to retain a cable or wire placed through the aperture 116. While such connectors may adequately retain a wire, such connectors occupy at least a portion of the internal volume 114 of the housing 111 and, therefore, impede placement of electronic devices within the housing 111 and, likewise, reduce the available space within the housing for placement of multiple electronic devices or relatively larger electronic devices.

Accordingly, it can be appreciated that, for safe and effective distribution and control of electric power, connectors for electrical boxes and electrical boxes with connectors are needed to provide one or more advantages with respect to at least the above-noted deficiencies of known boxes and connectors. The present disclosure provides an assembly 100 for electrical distribution including an electrical box 110 and an electrical connector 120 having features that can be provided either alone or in combination to facilitate safe and effective electrical connection and electrical distribution while achieving advantages that cannot be obtained by known electrical boxes or known electrical connectors.

Figure 2:
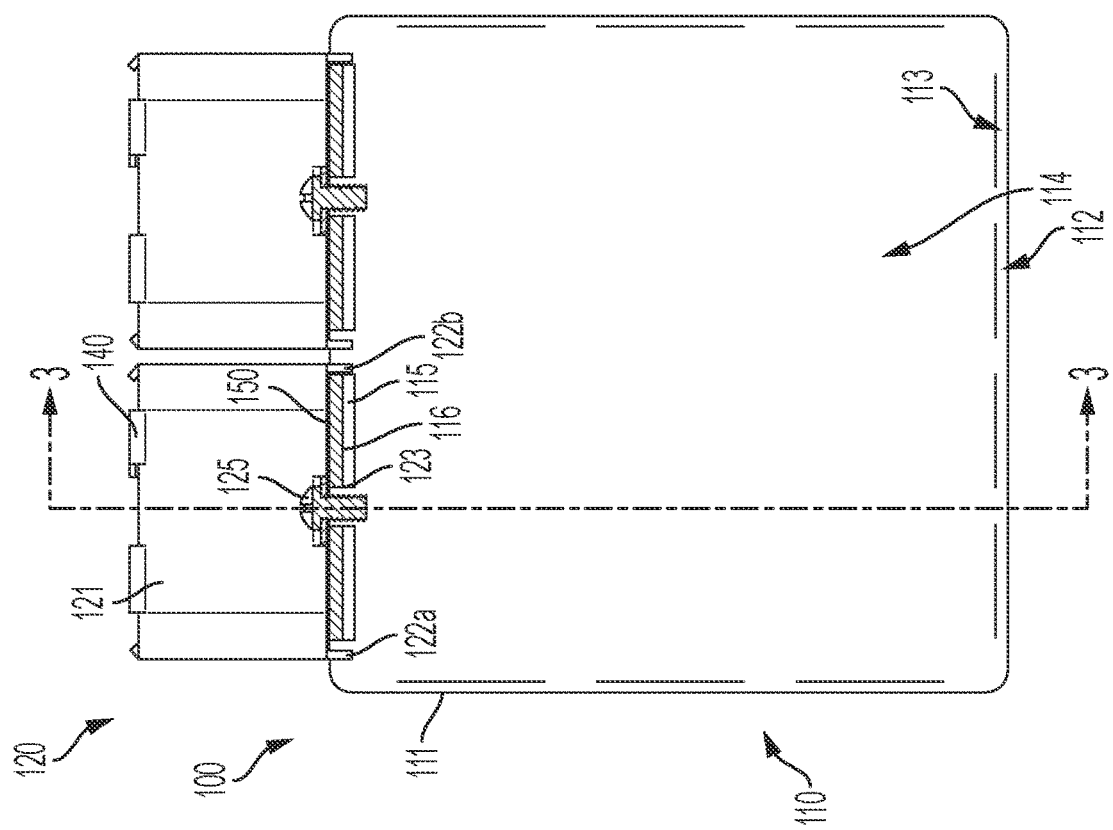
FIG. 2 is a plan view of the electrical box and the electrical connector of the electrical connection assembly of FIG. 1.

FIG. 2 is a plan view of the electrical box 110 and the electrical connector 120 of the electrical connection assembly 100 of FIG. 1 showing the electrical connector 120 attached to the electrical box 110 with a fastener 125 (e.g., screw, bolt, rivet, peg, pin, adhesive, material bonding technique, weld). The electrical connector 120 includes a frame 121 that includes a flange 126, and the housing 111 includes a recess 123 (e.g., aperture, notch). The fastener 125 mechanically couples the flange 126 of the frame 121 of the electrical connector 120 to the recess 123 of the housing 111 of the electrical box 110.

As shown, the electrical connector 120 is fixed to the outside of the housing 111 without displacing the disc 115 secured in the aperture 116. That is, the electrical connector 120 is mechanically attached to the electrical box 110 relative to an aperture 116 with the disc 115 obstructing the aperture 116 remaining in-tact and unaffected by the attachment of the electrical connector 120. Thus, per some electrical codes, because the electrical connector 120 is connected without displacing the disc 115 of the aperture 116, the technician has the option of (a) removing the disc 115 and placing a wire through the aperture 116; or, (b) leaving the disc 115 in place to obstruct the aperture 116. Either option (a) or (b) can be performed while the connector 120 is and remains connected to the electrical box 110.

The electrical connector 120 and electrical box 110 of the electrical connection assembly 100, therefore, eliminate the initial step of removing the disc 115 from the aperture 116 and connecting a known connector (not shown) to the aperture 116 (e.g., by threaded engagement or snap-fit engagement). Moreover, the electrical connector 120 and electrical box 110 of the electrical connection assembly 100 also eliminate the additional step of plugging or blocking an aperture 116 to which a known connector has been attached (requiring removal of the disc 115) but through which a wire was not subsequently placed.

Further, by fastening the electrical connector 120 to the outside (e.g., outer surface 112 of the housing 111, the internal volume 114 of the housing 111 is not occupied by the electrical connector 120 and, therefore, the internal volume 114 provides maximum space for placement of a variety of electrical components and wiring. Thus, the electrical connector 120 fixed, with fastener 125, to the outside of the electrical box 110 provides an efficient and versatile electrical connection assembly 100. Moreover, the electrical connection assembly 100 enables technicians to have added flexibility and reliability with respect to the type of electrical components housed within the internal volume 114 of the housing 111 as well as the type and arrangement of wiring configurations employed with respect to the electrical connector 120, thereby achieving desired power distribution and control for a variety of diverse applications.

In the illustrated embodiment, the electrical connector 120 includes one or more protruding tabs 122a, 122b extending from the frame 121 of the connector 120 and configured to mate with corresponding notches provided on a wall of the housing 111 relative to the aperture 116. The protruding tabs 122a, 122b function as additional fasteners or hooks that, along with fastener 125, further secure the electrical connector 120 to the electrical box 100. For example, in some embodiments, the protruding tabs 122, 122b can be provided as an "L" shape or a "T" shape.

Figure 3:
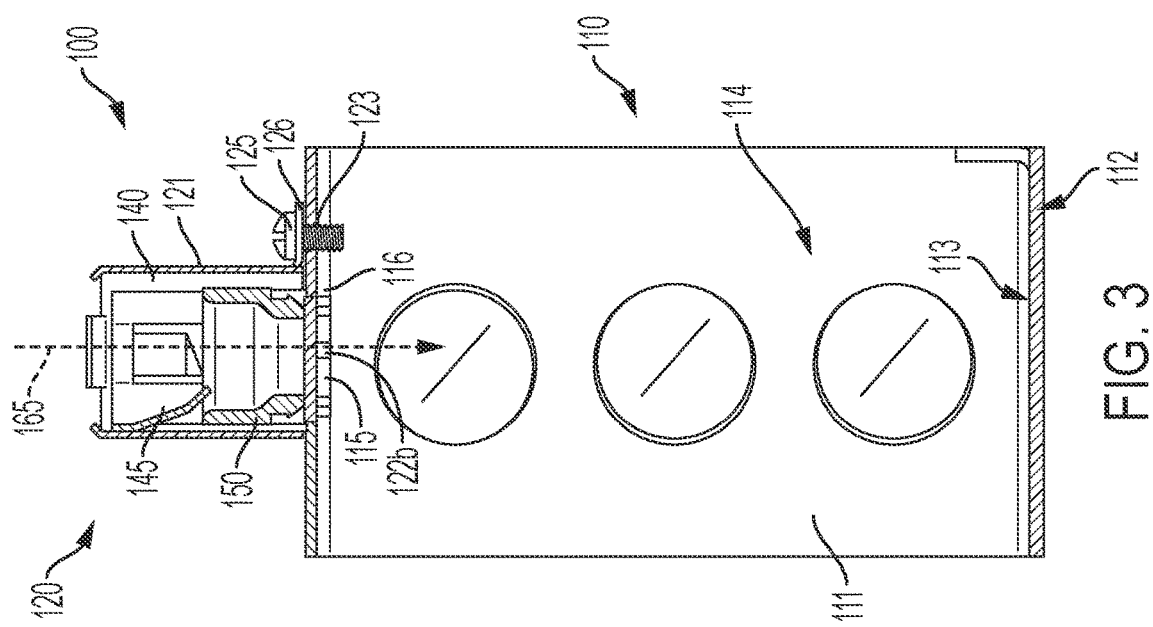
FIG. 3 is cross-sectional view of the electrical box and the electrical connector taken along line 3-3 of FIG. 2.

To facilitate fastening of an electrical wire with the electrical connector 120, the electrical connector 120 can include a retainer 140. As shown in FIG. 3, which illustrates a cross-sectional view of the electrical box 110 and the electrical connector 120 taken along line 3-3 of FIG. 2, the retainer 140 can be fitted, inserted, or formed within the frame 121. The retainer 140 can define an insertion path 165 extending from a front opening of the frame 121 to a rear opening of the frame 121 adjacent to the housing 111. The insertion path 165 can define a linear or non-linear path and corresponding opening along which one or more wires can be passed. For example, electrical wires and cables as well as tools can be inserted into the frame 121 and passed through the retainer 140 along the insertion path 165 into the internal volume 114 of the housing 111. The retainer 140 can include one or more teeth 145 extending radially inward from the frame 121 to clamp and grip the wire (e.g., an electrically insulated coating or protective sheath of a wire) inserted into the electrical connector 120. Although three teeth 145 are shown radially spaced around the internal boundary of the retainer 140, a single tooth or more than three teeth can be provide in further embodiments.

Additionally, the teeth 145 can be angled, and can include a variety of shapes and structures oriented to clamp and grip a wire including mechanically flexible or depressible teeth 145 that, when depressed (e.g., by a wire), exert an opposing, spring-back force on the wire to retain the wire within retainer 140 and the frame 121 of the electrical connector 120. A plurality of retainers 140 can be coupled with a corresponding plurality of frames 121 to provide a single, duplex, triple, quadruple, or other multiple-type electrical connector 120 without departing from the scope of the disclosure. The retainer 140 can be positioned to align with the aperture 116 to define the insertion path 165 as extending through the connector 120 and into the electrical box 110. For example, one retainer 140 can be employed for a single connector associated with a single aperture 116, two retainers 140 can be employed for a duplex connector 120 associated with two apertures 116, and so forth.

Figure 4:
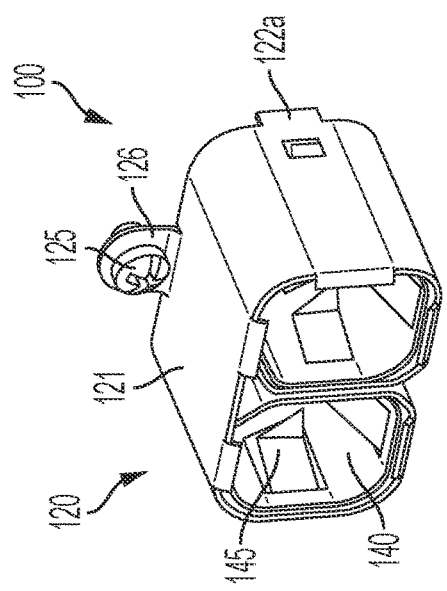
FIG. 4 is a perspective view of an electrical connector in accordance with embodiments of the disclosure.

FIG. 4 is a perspective view of a duplex-type electrical connector 120 with the electrical box 110 removed for clarity. As shown, the frame 121 includes two retainers 140 each of which has corresponding teeth 145. The fastener 125 and the flange 126 along with protruding tab 122a are also shown. Similarly, FIG. 5 is an alternate perspective view of the duplex-type electrical connector 120 of FIG. 4 showing the protruding tab 122b.

Figure 6:
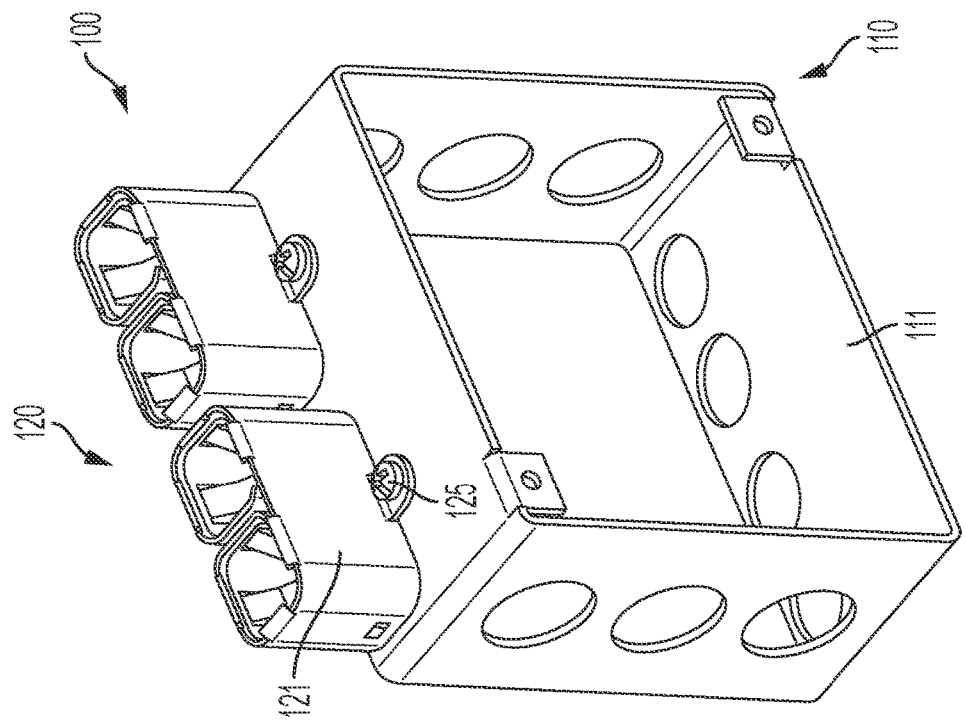
FIG. 6 is a perspective view of an electrical connection assembly similar to the electrical connection assembly of FIG. 1, including an electrical box and the electrical connector of FIG. 4 and FIG. 5.

FIG. 6 is a perspective view of the electrical connection assembly 100 of FIG. 1 showing the discs 115 (e.g., knock-outs) removed and not obstructing the apertures 116. Unless otherwise noted, it is to be understood that such discs 115 could be provided to obstruct the apertures 116 (as shown in FIG. 1) without departing from the scope of the disclosure. The electrical connection assembly 100 includes the electrical box 110 and two duplex-type electrical connectors 120 of FIG. 4 and FIG. 5 fastened to the outside of the housing 111 of the electrical box 110 with fastener 125.

Figure 5:
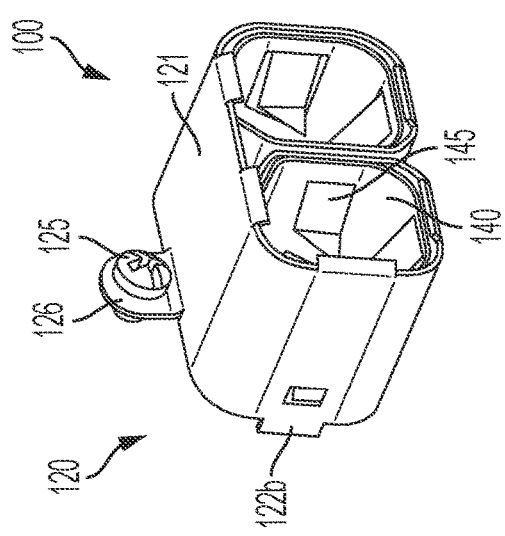
FIG. 5 is an alternate perspective view of the electrical connector of FIG. 4.
Figure 7:
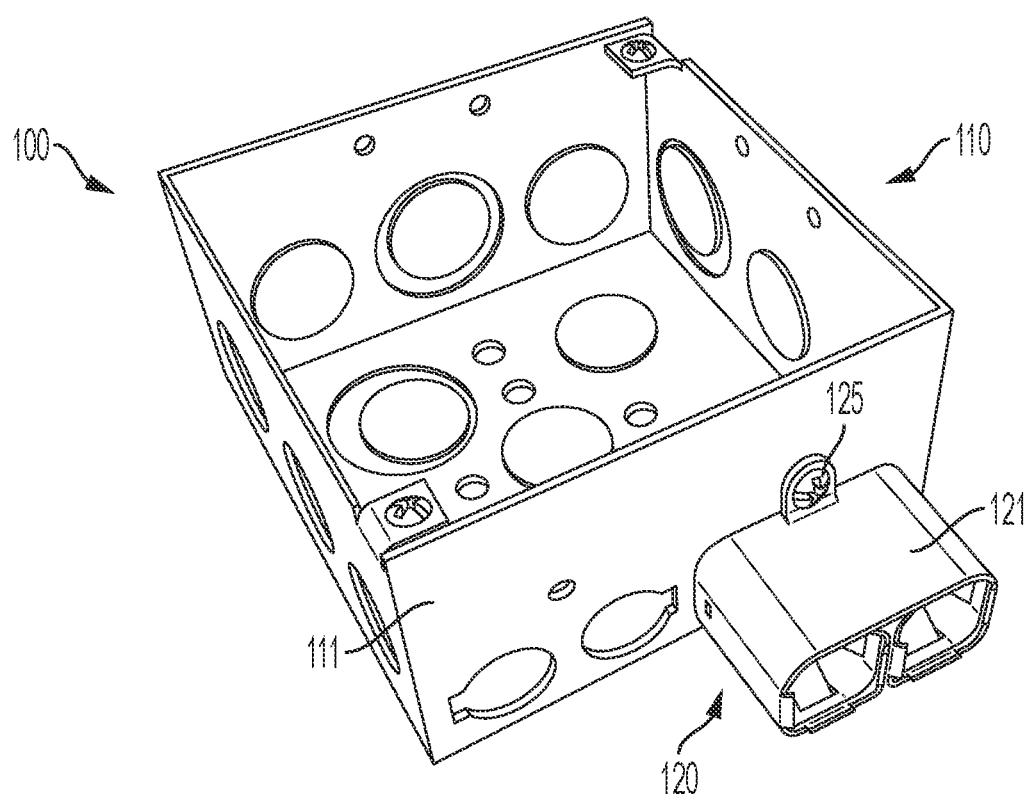
FIG. 7 is a perspective view of an electrical connection assembly including an electrical box and the electrical connector in accordance with embodiments of the disclosure.
Figure 8:
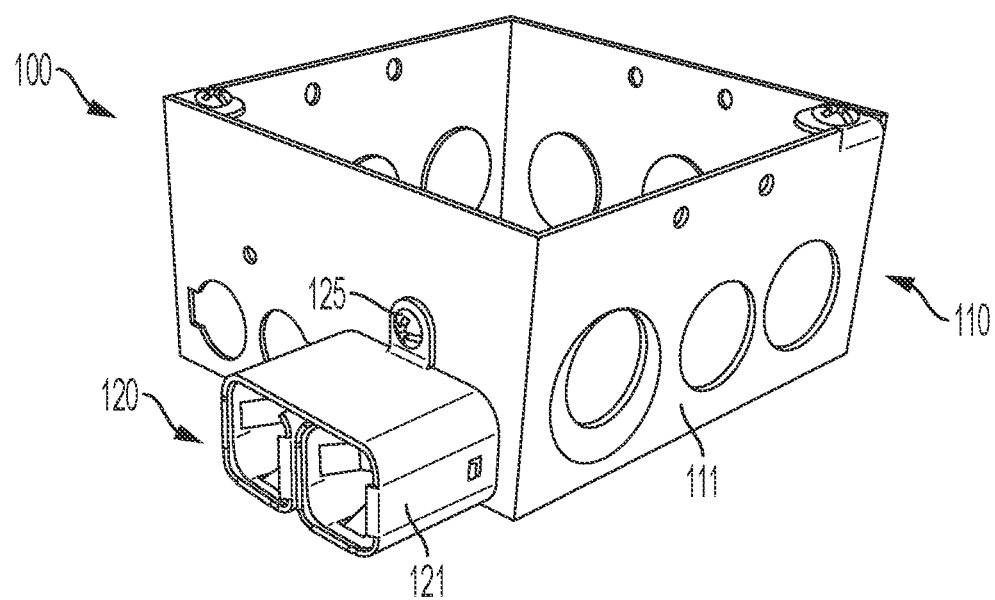
FIG. 8 is an alternate perspective view of the electrical connection assembly of FIG. 7 including the electrical box and the electrical connector.

Further, FIG. 7 is a perspective view of an electrical connection assembly 100 including the electrical box 110 and one duplex-type electrical connector 120 of FIG. 4 and FIG. 5 fastened to the outside of the housing 111 of the electrical box with fastener 125. FIG. 8 is an alternate perspective view of the electrical connection assembly 100 of FIG. 7 including the electrical box 110 and the electrical connector 120.

Figure 9:
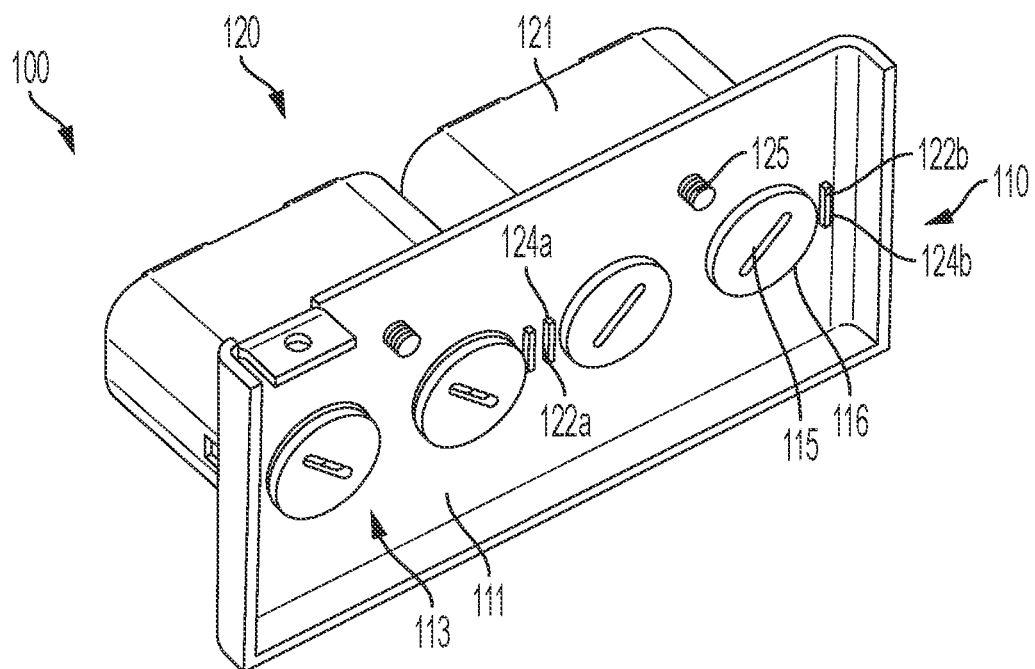
FIG. 9 is a partial perspective view of the electrical connection assembly including the electrical box and the electrical connector of FIG. 6 including knock-out discs.

FIG. 9 is a rear partial perspective view of the electrical connection assembly 100 including the electrical box 110 and the electrical connector 120 of FIG. 6 with a portion of the electrical box 110 removed for clarity. The protruding tabs 122a, 122b are inserted through the corresponding notches 124a, 124b without disturbing the disc 115 and further secure the electrical connector 120 to the electrical box 100. In some embodiments, the protruding tabs 122a, 122b and the fastener 125 can securely fasten the electrical connector 120 to the exterior of the electrical box 110 such that wires placed through the aperture 116 (e.g., after removal of the disc 115) will not pull-out or disconnect from the electrical connector 120 or the electrical box 110.

The notches 124a, 124b can be provided as a slot or opening in the housing 111 adjacent to the aperture 116 or integrally formed as part of the perimeter (e.g., boundary) of the aperture 116. For example, the aperture 116 may define a keyed or notched perimeter, and the disc 115 may define a circular perimeter that, when positioned to within the aperture 116, substantially obstructs the aperture 116 (e.g., in compliance with certain electrical codes) while providing the keyed or notched opening as notches 124a, 124b. Although two protruding tabs 122a, 122b and two corresponding notches 124a, 124b are shown, in further embodiments one protruding tab and one notch or more than two protruding tabs with more than two corresponding notches can be provided without departing from the scope of the disclosure.

As shown, the discs 115 are attached to the housing 111 and obstruct the aperture 116 while the electrical connector 120 is also attached to the housing 110. Additionally, the protruding tabs 122a, 122b extending through corresponding notches 124a, 124b abut the internal surface 113 of the housing 111 to secure the frame 121 to the outside of the housing 111 along with fastener 125. The electrical connector 120 and electrical box 110 are supplied to a technician as a completed assembly 100 with the electrical connector 120 fixed to the electrical box 110 and with the discs 115 in place obstructing the aperture 116, as per certain electrical codes. Upon a decision to insert a wire through a particular aperture 116, the disc 115 can be removed (e.g., at least partially disconnected from) the housing 111 to provide the insertion path 165 for insertion of the wiring through the connector 120, where the wire is be retained by the retainer 140.

Figure 10:
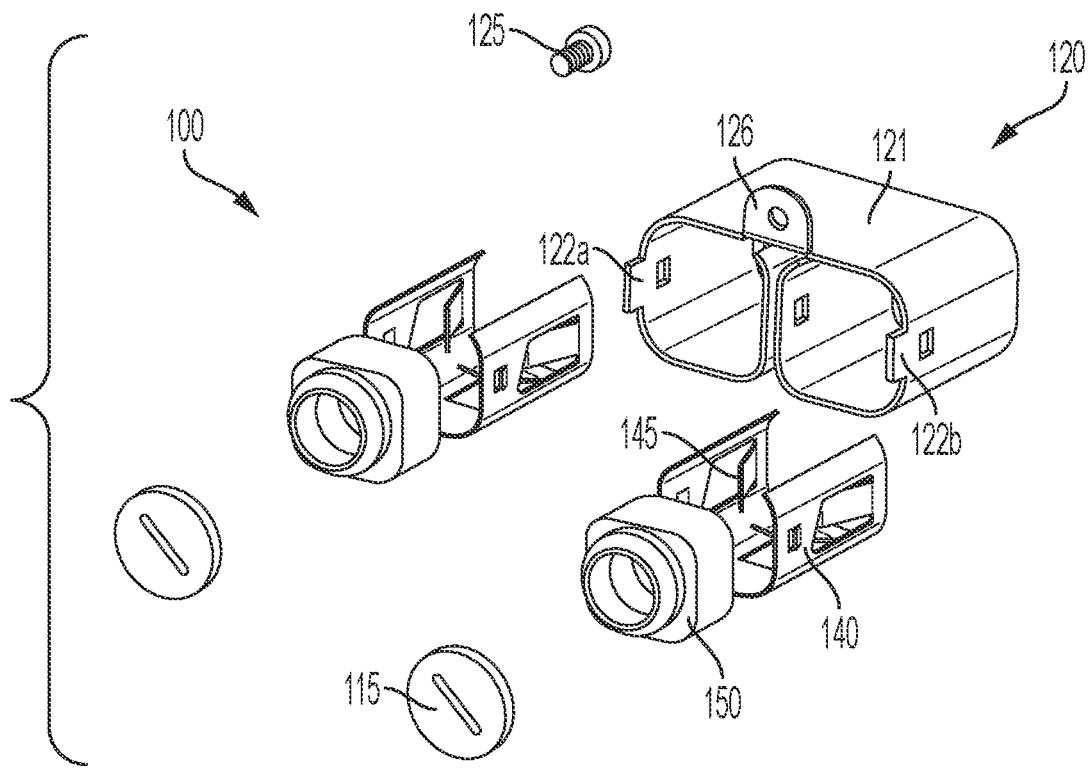
FIG. 10 is an exploded perspective view of an embodiment of an electrical connector including an electrical insulating bushing in accordance with embodiments of the disclosure.

FIG. 10 is an exploded perspective view of an embodiment of the electrical connector 120 showing the retainer 140 separated from the frame 121 for visual purposes. In some embodiments, the retainer 140 can include an electrical insulating bushing 150 circumscribing the insertion path 165. For example, the electrical insulating bushing 150 can be attached, pressed, or formed to the retainer 140 of the frame 121. The electrical insulating bushing 150 is manufactured from an electrical insulating material (e.g., plastic, rubber, polymer) and can be inserted into the retainer 140. In some embodiments, the bushing 150 is positioned within the retainer 140 near a front end of the frame 121. The bushing is then slid along the insertion path 165 (See FIG. 3) within the retainer 140 until the bushing 150 is securely seated within a rear of the frame 121. For example, a technician inserts a wire from a front end of the frame 121 of the connector 120 to a rear end of the frame 121 of the connector 120, the wire can contact the bushing 150, thereby exerting a force on the bushing 150, causing the bushing 150 to slide (e.g., translate) along the insertion path 165 with the movement and ultimate placement of the wire through the connector 120 and into the internal volume 114 of the electrical box 110.

The bushing can snuggly fit within the rear of the retainer 140, can snap or press into place at the rear of the retainer 140 or otherwise be positioned within the retainer 140 to electrically isolate (e.g., insulate) an electrical current carried by an electrically conductive wire from inadvertently electrically contacting (e.g., arcing, sparking) with one or more electrically conductive features of the electrical connection assembly 100. For example, turning back to FIG. 3, in some embodiments, the electrical insulating bushing 150 can extend around the internal perimeter of the aperture 116 to partition the electrical wire from electrical contact or electrically arcing or sparking with one or more of the electrically conductive frame 140, housing 111, or aperture 116. By extending around the internal perimeter of the aperture 116, the electrical insulating bushing 150 can also cover and shield sharp protrusions that may exist around the internal perimeter of the aperture 116 from otherwise snagging, tearing, cutting, or penetrating the electrically insulated coating or protective sheath in which the wire may be wrapped.

Figure 11:
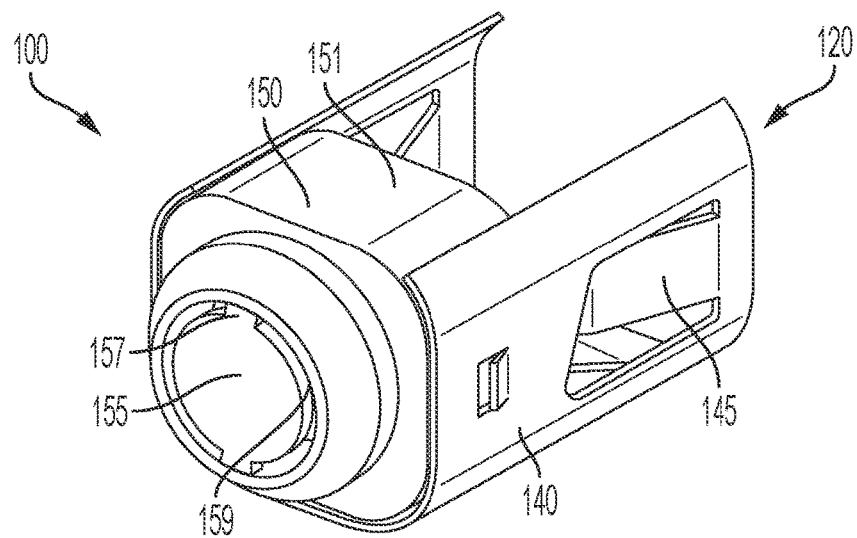
FIG. 11 is a perspective view of another embodiment of an electrical connector including an electrical insulating bushing having a membrane, with some features removed for clarity.
Figure 12:
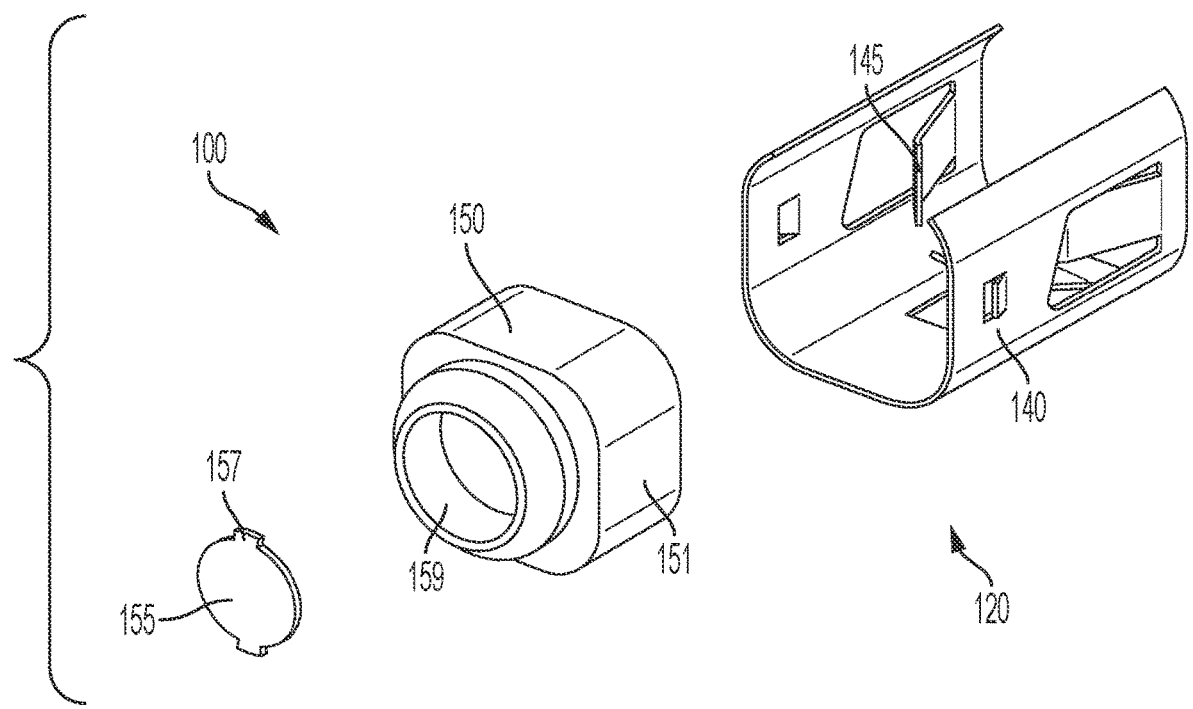
FIG. 12 is an exploded perspective view of the electrical connector including an electrical insulating bushing having a membrane of FIG. 11, with some features removed for clarity.

FIG. 11 is a perspective view of another embodiment of an electrical connector 120 including an electrical insulating bushing 150 having a membrane 155, with some features removed for clarity. For example, for explanation purposes, the frame 121 of the connector 120 as well as the electrical box 110 are removed with the understanding that the electrical insulating bushing 150 having a membrane 155 can be employed alone or with one or more features of the electrical connection assembly 100 without departing from the scope of the disclosure. FIG. 12 is an exploded perspective view of the electrical connector 120 including the electrically insulating bushing 150 having a membrane 155 of FIG. 11. When provided, the membrane 155 can function as a disc 115 (e.g., knock-out, as described above) and may comply with certain electrical codes that require an unused aperture 116 (e.g., an aperture 116 through which no wire is placed) to be blocked, plugged, or otherwise obstructed. Thus, in some embodiments, an electrical connector 120 including an electrically insulating bushing 150 having a membrane 155 can be provided with or without a corresponding disc 115 to obstruct the aperture 116. Providing the membrane 155 allows further flexibility to a technician with respect to wiring configurations and compliance with certain electrical codes that cannot otherwise be obtained with a traditional disc 115.

The membrane 155 can be a solid piece connected to a body 151 of the bushing 150 with a frangible attachment 157 that can be broken with a tool (e.g., screwdriver, electrical wire). The frangible attachment 157 can be broken as a separate step or simultaneously in a single step when inserting a wire into the connector 120 along the insertion path 165, thereby reducing the number of steps a technician employs to connect a wire to the electrical box 110.

The membrane 155 can be formed as part of the insulating bushing 150 defining a cap or closed end of the bushing 150. In some embodiments, the membrane 155 can be positioned at a variety of locations within the retainer 140 relative to the body 151 of the bushing 150 to obstruct the insertion path 165 leading to the aperture 116. Similarly, the membrane 155 can be formed or positioned at a variety of locations within the body 151 of the bushing 150 (e.g., between a first end and a second end of the bushing 150) to obstruct the insertion path 165 leading to the aperture 116. In some embodiments, the membrane 155 can obstruct the entire opening 159 defined in the body 151 of the bushing 150 to completely cap or close the opening 159. Alternatively, the membrane 155 can at least partially obstruct the opening 159 of the bushing 150 to at least partially cap or close the opening 159. The membrane 155 functions as the disc 115 until the frangible attachment 157 is broken and the membrane 155 is released. Once the frangible attachment 157 is broken, the opening 159 of the bushing 150 is unobstructed to permit insertion of a wire along insertion path 165 (as shown in FIG. 3). The frangible attachment 157 can be manufactured from the same or different material of either one of the membrane 155 and a body of the bushing 150 such that the attachment 157 breaks, fails, separates, or otherwise disconnects the membrane 155 from a body of the bushing 150 upon application of a force.

In addition or alternatively, the membrane 155 itself can be formed entirely or partially from a frangible material such that a force (e.g., contact by a tool, contact with a wire) breaks, pierces, tears, or otherwise disables the membrane 155 to permit insertion of wires through the connector 120 and into the electrical box 110. The frangible material of the membrane 155 can be manufactured from a variety of materials such as plastic, a brittle material, an elastic or elastomeric material that fails under a predetermined stress, or a rubber or other pierceable (e.g., locally penetrable) material that fails when exposed to a predetermined force or stress. In some embodiments, the frangible material of the membrane 155 can be defined as failing upon application of a predetermined stress where the predetermined stress is less than a stress at which a body of the bushing 150 fails upon application.

Figure 13:
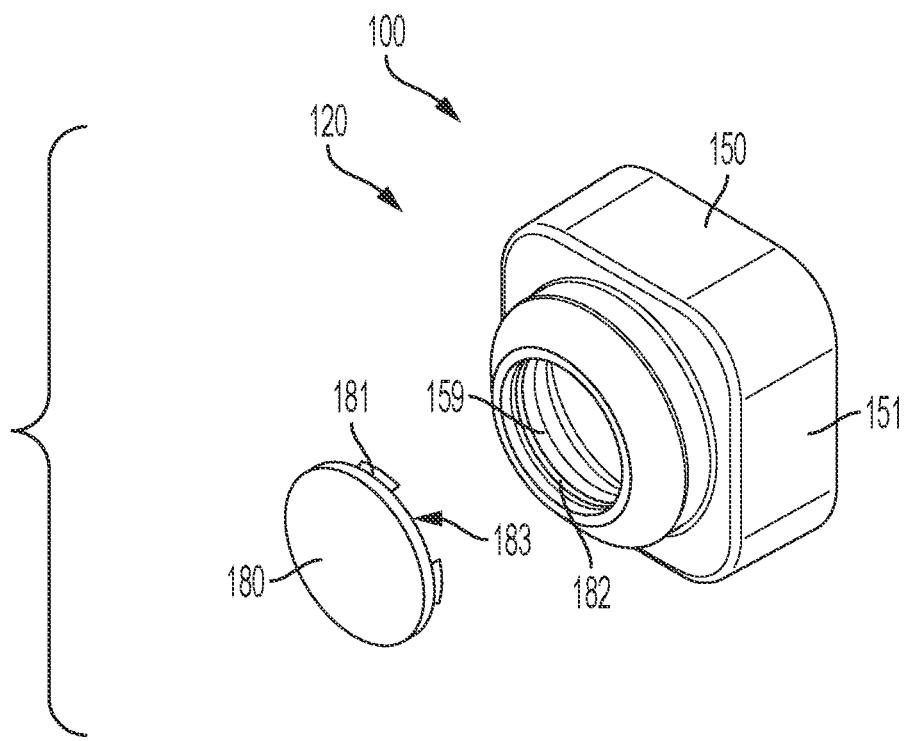
FIG. 13 is an exploded perspective view of an embodiment of an electrical insulating bushing having a reusable membrane with tabs.

FIGS. 13-17 show alternate embodiments of the electrical bushing 150 with optionally reusable membranes. For example, FIG. 13 shows a membrane 180 with one or more tabs 181 extending from a backside 183 of the membrane 180. The tabs 181 are configured to engage with a channel 182 that extends circumferentially about the inner diameter of the opening 159 of the body 151 of the bushing 150. For example, the tabs 181 can include a flange, lip, protrusion, or other extending structure configured to contact the channel 182 to retain the membrane 180 in a position obstructing the opening 159. The channel 182 is recessed relative to the inner surface of the opening 159 such that the tabs 181 position and secure within the channel 182 to retain the membrane 180 in the bushing 150. While in the illustrated embodiment, the channel 182 fully circumscribes the opening 159, in alternative embodiments, the channel 182 can be formed as one or more segmented channels that at least partially circumscribe the opening 159.

As with other examples discussed herein, a technician can remove the membrane 180 from the opening 159 with a tool or by manually applying a force (e.g., with a finger or with a cable) to disengage the one or more tabs 181 from the channel 182. The tabs 181 may be resilient and flex to optionally allow replacement of the membrane 180 in the opening 159 once removed. Thus, the membrane 180 with tabs 181 can optionally be reused one or more times within the bushing 150 (e.g., removed and replaced) to obstruct the opening 159 of the bushing 150 or permit access through the opening 159 of the bushing 150. The reusable nature of the membrane 150 allows a technician to reconfigure an electrical box assembly 100 at any time (e.g., during installation or at a later time should wiring objectives change). Additionally, in some embodiments, the membrane 180 with tabs 181 can be removed from the opening 159 by disengaging the tabs 181 from the channel 182 with less force than may be applied to remove a metal knockout. Thus, the membrane 180 with tabs 181 may enable faster installation and better user experience for technicians.

Figure 14:
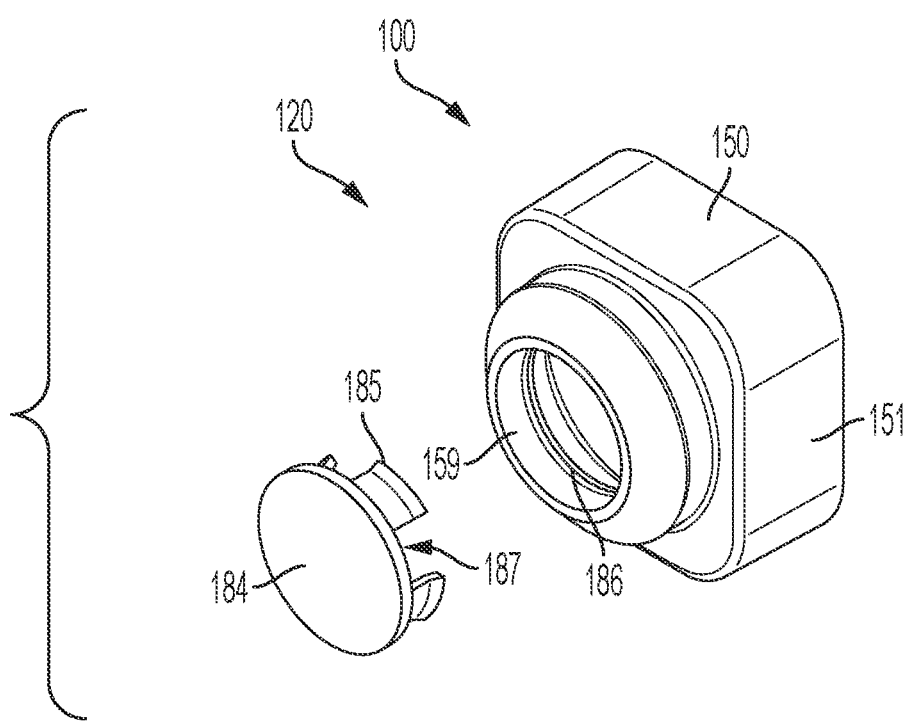
FIG. 14 is an exploded perspective view of another embodiment of an electrical insulating bushing having a reusable membrane with tabs.

FIG. 14 provides another embodiment of a reusable membrane 184 having one or more flanges 185 extending from a backside 187 of the membrane 184. The flanges 185 are configured to engage a lip 186 on the inner diameter of the opening 159. The lip 186 is raised relative to the inner surface of the opening 159 such that the flanges 185 position and secure against the lip 186 to retain the membrane 184 in the bushing 150. For example, the flanges 185 can flex inward (e.g., elastically deform) when positioning the membrane 184 in the opening 159 clearing the lip 186. The flanges 185 can then spring back outward to contact the lip 186 once the membrane 184 is positioned within the opening 159. The engagement between the flanges 185 and the lip 186 secures the membrane 184 within the bushing 150. The lip 186 can fully circumscribe the opening 159 or be formed as one or more segmented lips that at least partially circumscribe the opening 159. As with the reusable bushing 180 of FIG. 13, the bushing 184 of FIG. 14 is optionally reusable and provides the same or similar advantages discussed above.

Figure 15:
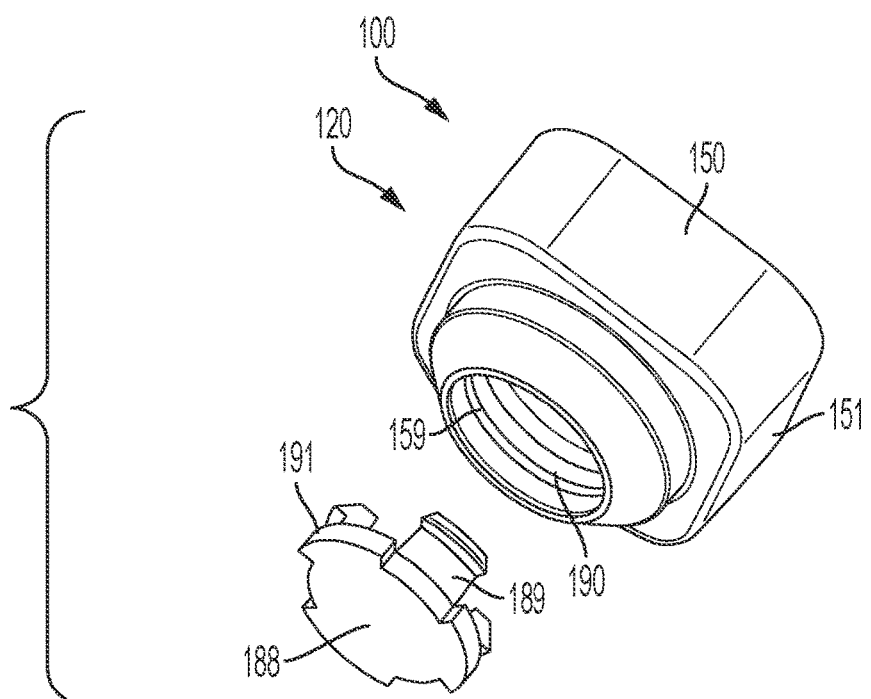
FIG. 15 is an exploded perspective view of yet another embodiment of an electrical insulating bushing having a reusable membrane with tabs.

FIG. 15 provides another embodiment of an optionally reusable membrane 188 with tabs 189. As compared to the membranes 180, 184 of FIG. 13 and FIG. 14, the tabs 189 of membrane 188 are formed at an edge 191 of the membrane 188 rather than extending from a backside of the membrane. The inner surface of the opening 159 can include at least one of a channel and a lip 190 similar to the channel 182 and lip 186 discussed above. The tabs 189 are configured to engage the channel or lip 190 to retain the membrane 188 within the bushing 150. Although illustrated as a plurality of tabs 189, in some embodiments, the membrane 188 can include a single tab formed along the entire edge 191 of the membrane 188.

Figure 16:
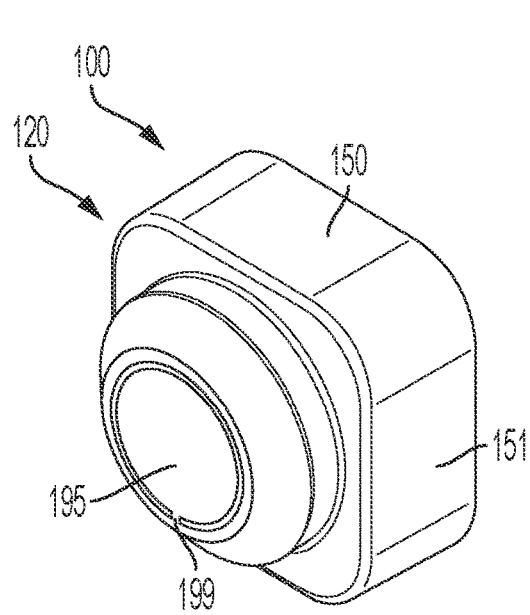
FIG. 16 is a perspective view of an embodiment of an electrical insulating bushing having a reusable membrane with a hinge.
Figure 17:
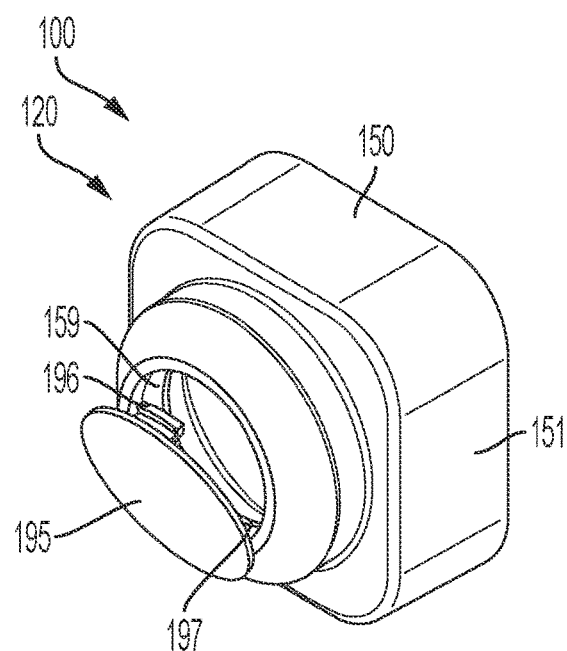
FIG. 17 is an exploded perspective view of the electrical insulating bushing having a reusable membrane with a hinge of FIG. 16.

FIGS. 16 and 17 show yet another embodiment of an optionally reusable bushing 195 with a hinge 199 connecting the membrane 195 to the body 151 of the bushing 150. The membrane 195 includes one or more tabs 196 that engage with at least one of a channel and a lip 197 to allow removal and replacement of the membrane 195 in the opening 159. The hinge 199 connects the membrane 195 to the bushing 150 when the membrane 195 is obstructing the opening 159 (shown in FIG. 16) and when the membrane 195 is removed to allow access through the opening 159 (shown in FIG. 17). The hinge 199 can be formed as an integral component connecting the membrane 195 and the bushing 150 and may be configured to bend and flex without breaking. The hinge 199 may be a barrel hinge, a living hinge, or any other type of hinge. In addition to the advantages discussed above with respect to reusable membranes, the membrane 195 with a hinge 199 stays attached to the bushing 150 at all times and reduces the likelihood of losing or misplacing the membrane 195 and ensures the membrane 195 is available to be replaced and reused by any technician servicing the electrical assembly 100.

Figure 19:
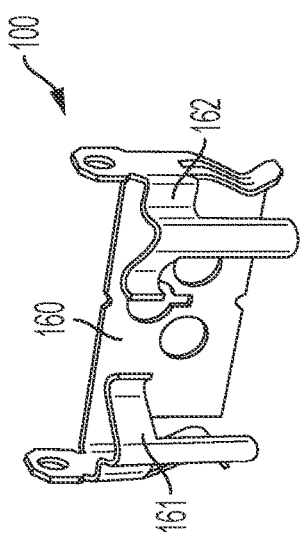
FIG. 19 is a perspective view of a clip for cable management oriented to attach to an end of the support bracket of FIG. 18.
Figure 18:
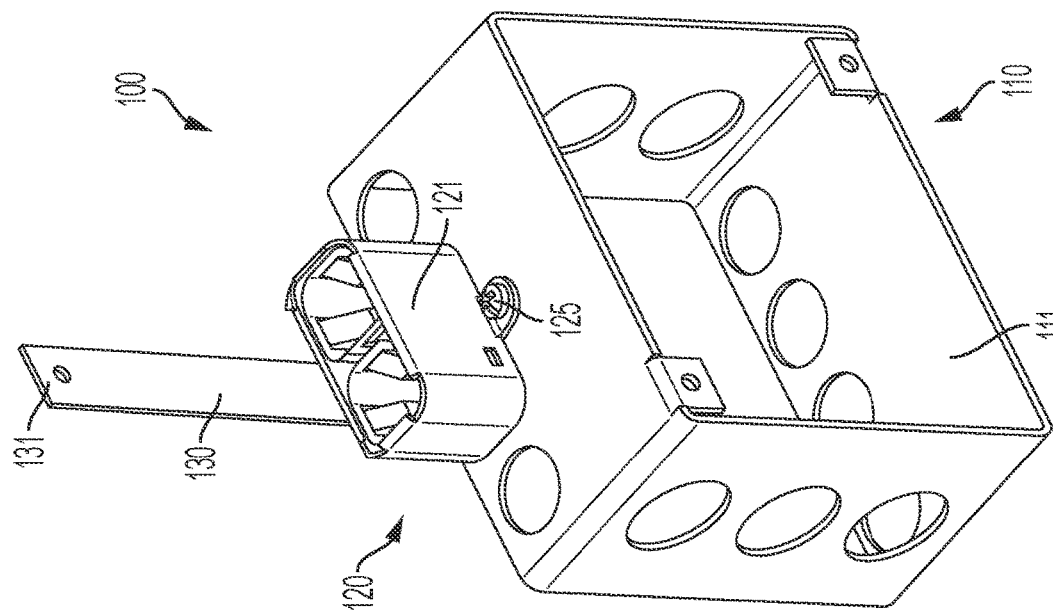
FIG. 18 is a perspective view of an electrical connection assembly including an electrical box, an electrical connector, and a support bracket, in accordance with embodiments of the disclosure.

FIG. 18 is a perspective view of the electrical connection assembly 100 including the electrical box 110, the electrical connector 120, and a support bracket 130. The support bracket 130 includes a first end 131 and a second end 132 (not visible in this view). The first end 131 can include one or more wiring accessories to facilitate positioning, placement, and support of wires or cables connected to the electrical box 110 with the electrical connector 120. For example, FIG. 19 is a perspective view of a clip 160 for cable management oriented to attach to the first end 131 of the support bracket of FIG. 18. The clip 160 includes fingers 161, 162 oriented to clasp and retain cables in a neat, controlled, and manageable fashion. The clip can be secured to the first end 131 of the support bracket with one or more fasteners (e.g., screw, bolt, rivet, peg, pin, adhesive, material bonding technique, weld) and can be selected to include a particular size, shape, or feature depending on, for example, the type, amount, and size of wire connected to the electrical box 110.

Figure 20:
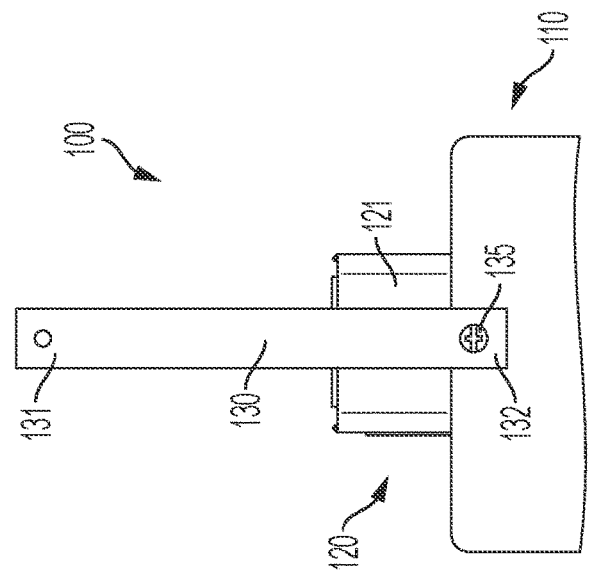
FIG. 20 is a partial rear view of the electrical connection assembly including the electrical box, the electrical connector, and the support bracket of FIG. 18.

As shown in FIG. 20, which is a partial rear view of the electrical connection assembly 100 including the electrical box 110, the electrical connector 120, and a support bracket 130 of FIG. 18, the second end 132 of the support bracket 130 connects to the electrical connector 120 or the electrical box 110 with a fastener 135 (e.g., screw, bolt, rivet, peg, pin, adhesive, material bonding technique, weld). The cable management clip 160 is cantilevered from the electrical box 110 or the electrical connector 120 by the support bracket 130. The support bracket 130, either alone or in combination with the clip 160, support the electrical wire at a predetermined distance from the connector 120. Certain electrical codes may specify a particular predetermined distance measured from the electrical box 110 or the electrical connector 120 at which the wire is to be supported. Accordingly, in some embodiments, the support bracket 130 and the clip 160 can be selected to satisfy certain electric codes while providing additional support for the wires connected to the electrical box 110 with the connector 120.

Figure 21:
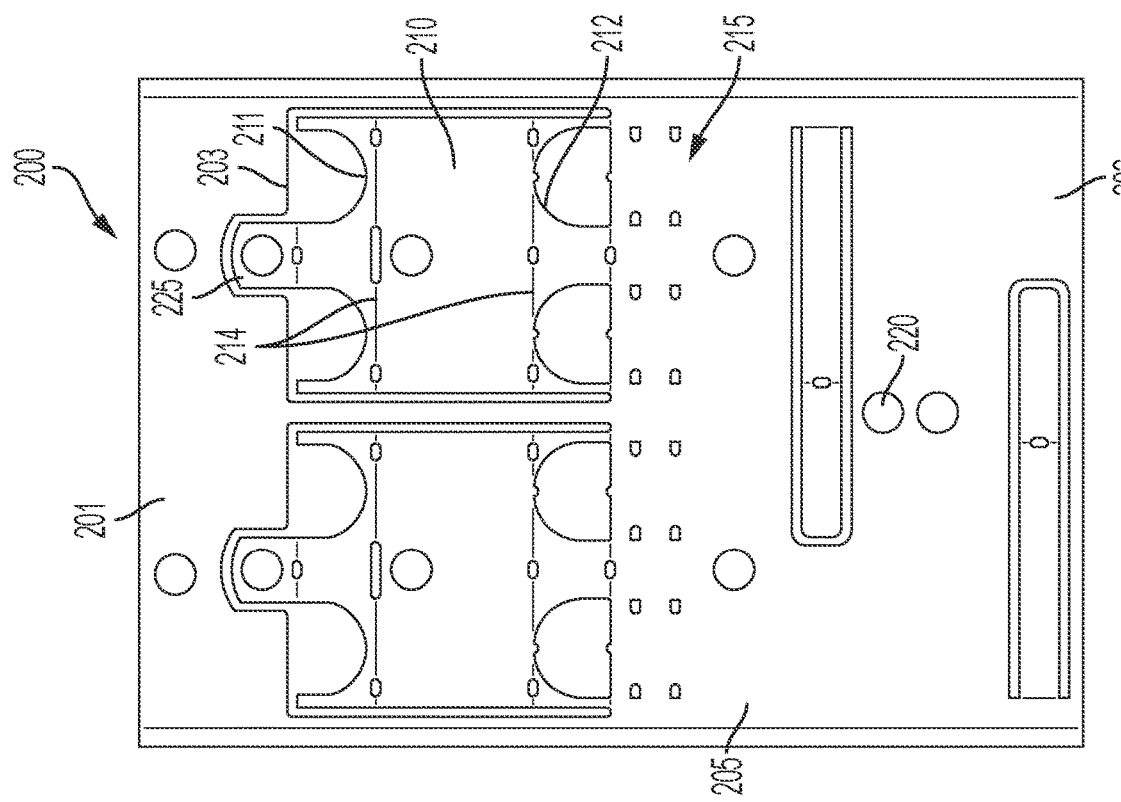
FIG. 21 is a plan view of a sheet of material including a pattern for providing an electrical attachment including an electrical connector in accordance with embodiments of the disclosure.

FIG. 21 is a plan view of a sheet of material 205 (e.g., metal, plastic, polymeric) including a pattern 203 for providing an electrical attachment 200 for an electrical box 210 including an electrical connector 210 in accordance with embodiments of the disclosure. The sheet 205 can be a single, monolithic piece of material on which a pattern 203 can be provided (e.g., drawn, imprinted, etched, cut, stamped, pressed, engraved) and from which the electrical attachment 200 is formed. In further embodiments, the sheet 205 can include a plurality of sheets that are mechanical attached (e.g., welded, bonded) together to provide a unitary sheet 205 on which the pattern 203 is provided and from which the electrical attachment 200 is formed.

A variety of features (e.g., protrusions, recesses, cutouts, bends, folds, seams, apertures, notches, flanges, tabs, and slots) can be formed (e.g., machined, manufactured, drawn, imprinted, etched, cut, stamped, pressed, engraved) on, in, and with the sheet 205. For example apertures 211, 212 of the electrical connector 210 can be formed along with fold lines 214 and a tab 225. Additionally, protrusions 215 and one or more apertures 220 can be formed in the sheet 205.

Figure 22:
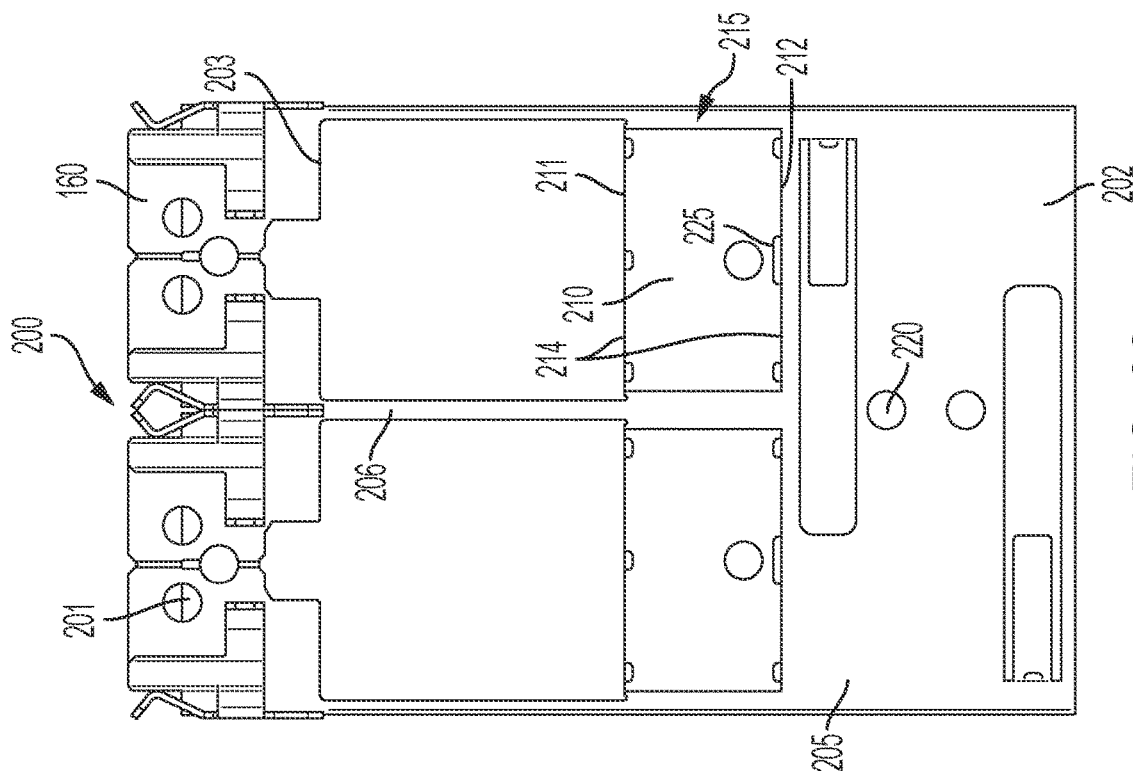
FIG. 22 is a plan view of the sheet of material of FIG. 21 after performing a method of manufacturing the sheet according to the pattern to provide the electrical attachment including the electrical connector.

FIG. 22 is a plan view of the sheet of material 205 of FIG. 21 after performing a method of manufacturing the sheet 205 according to the pattern 203 to provide the electrical attachment 200. The electrical connector 210 is formed by folding or bending a segment of the sheet 205 that is at least partially separated (e.g., severed, cut) from the sheet 205 according to the pattern 203. For example, folding or bending the patterned segment along lines 214 forms a frame of the electrical connector 210 that includes apertures 211 and 212 through which an electrical wire (not shown) can be placed. Similarly, tab 225 secures the electrical connector 210 to the sheet 205 (e.g., by mating engagement, mechanical fastener, adhesive, material bonding technique) to hold the folded or bent segment defining the electrical connector 210 in place. Protrusions 215 can facilitate positioning of and mechanically secure a retainer (e.g., retainer 140), and an electrical insulating bushing (e.g., bushing 150, bushing 150 and membrane 155).

After forming the electrical connector 210, a portion of the sheet 205 extending between a first end 201 and a second end 202 provides a support bracket 206 (e.g., similar to support bracket 160). A clip 160 can be attached to the first end 201, and an aperture 220 can be formed at the second end 202 of the attachment 200. In some embodiments, a feature can be provided at the first end 201 of the attachment 200 to retain the clip 160. The attachment 200 can then be mechanically coupled to an electrical box (e.g., electrical box 110) with a fastener (not shown) interacting with the aperture 220 to secure the attachment 200 to the box 210 (e.g., an underneath side of the box).

Figure 23:
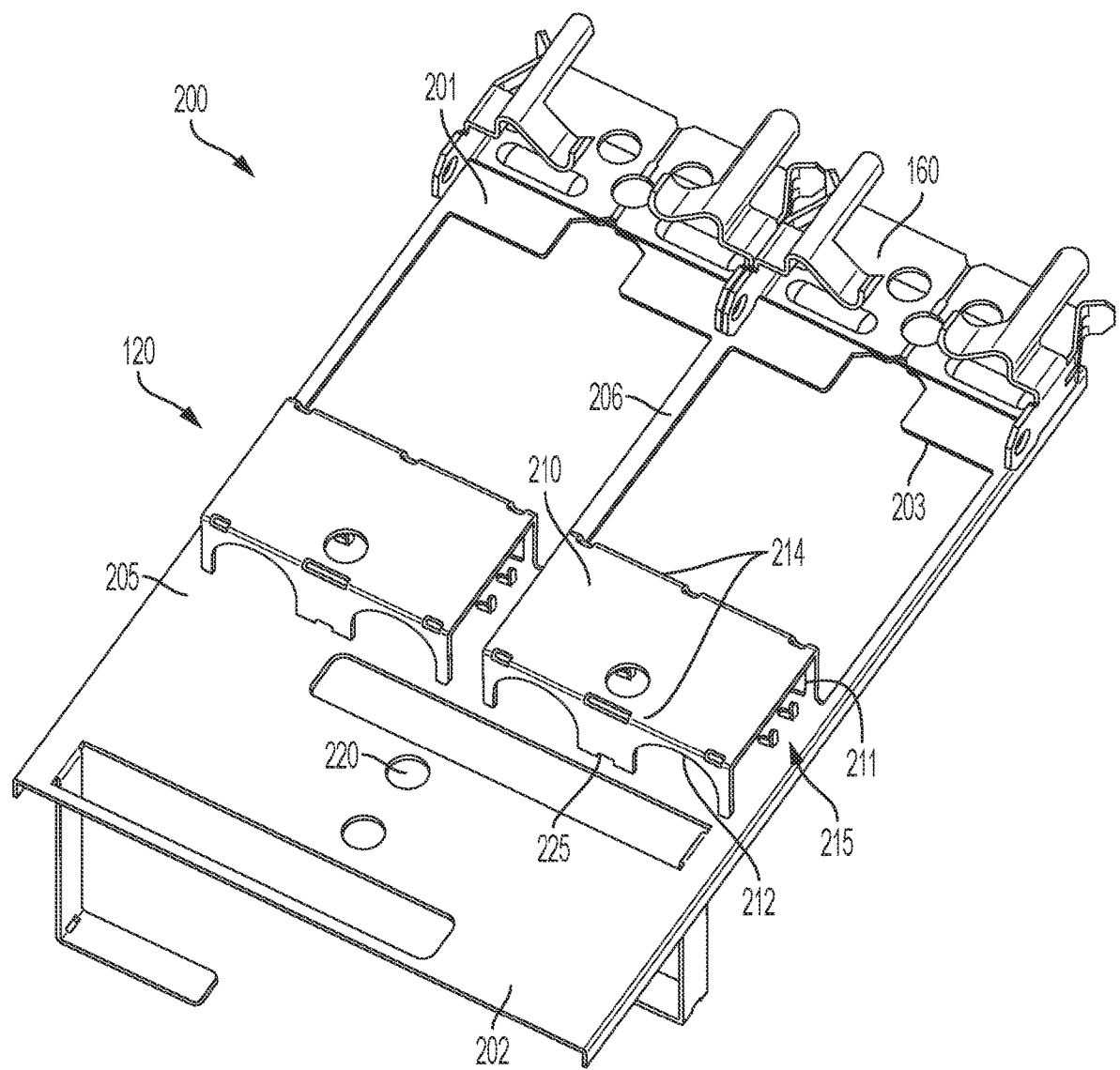
FIG. 23 is a perspective view of an electrical attachment including an electrical connector formed by the method of manufacturing the sheet according to the pattern of FIG. 22.
Figure 24:
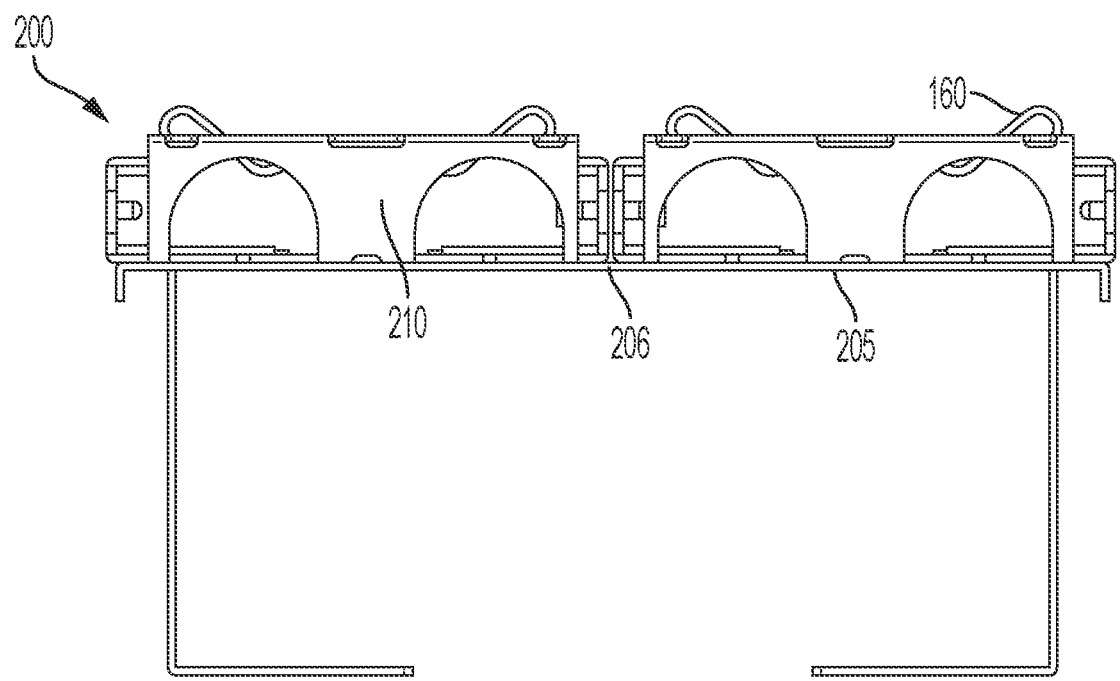
FIG. 24 is an end view of the electrical attachment including the electrical connector of FIG. 23.
Figure 25:
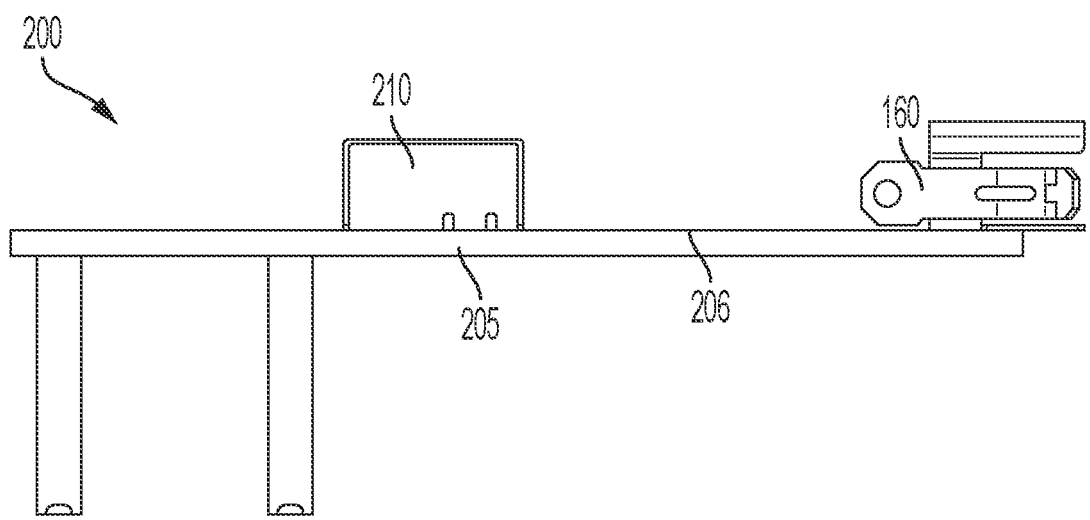
FIG. 25 is a side view of the electrical attachment including the electrical connector of FIG. 23.

FIG. 23 is a perspective view of the electrical attachment 200 of FIG. 21 and FIG. 22 after being formed by the method of manufacturing the sheet 205 according to the pattern 203. The electrical attachment 200 is a unitary attachment including an electrical connector 210 and a support bracket 206 that are integrally formed together. FIG. 24 is an end view of the electrical attachment 200 of FIG. 23, and FIG. 25 is a side view of the electrical attachment 200 of FIG. 23 showing the unitary construction of the attachment 200 including an electrical connector 210 and a support bracket 206.

The present disclosure provides several embodiments and features of electrical connectors 120 fixed to the outside of an electrical box 110 that facilitate and support a variety of wiring configurations and electrical components. The electrical connection assembly 100 achieves safe and effective distribution of electric power with the electrical box 110 and the electrical connector 120 of the present disclosure.

Figure 26:
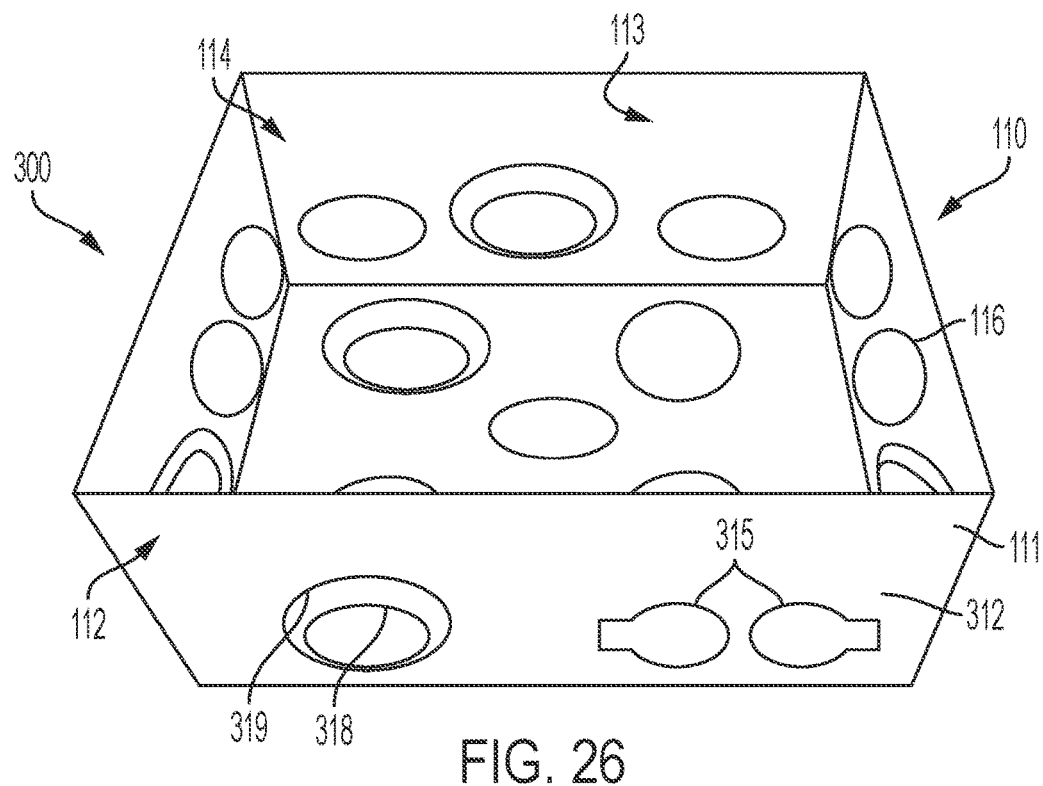
FIG. 26 is a schematic illustration of a perspective view of an alternate embodiment of an electrical box in accordance with embodiments of the disclosure.
Figure 27:
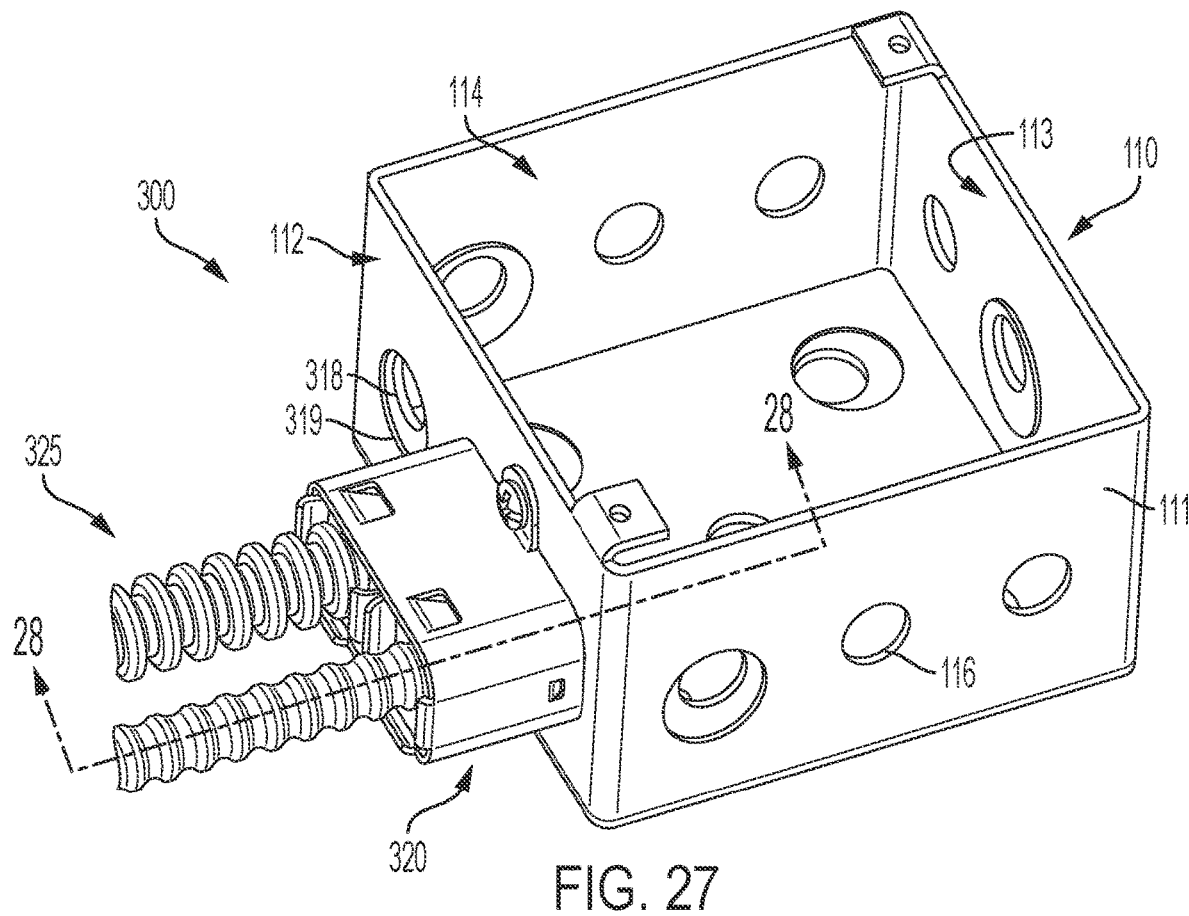
FIG. 27 is an alternate perspective view of the electrical box of FIG. 26 including an alternate embodiment of an electrical connector.
Figure 28:
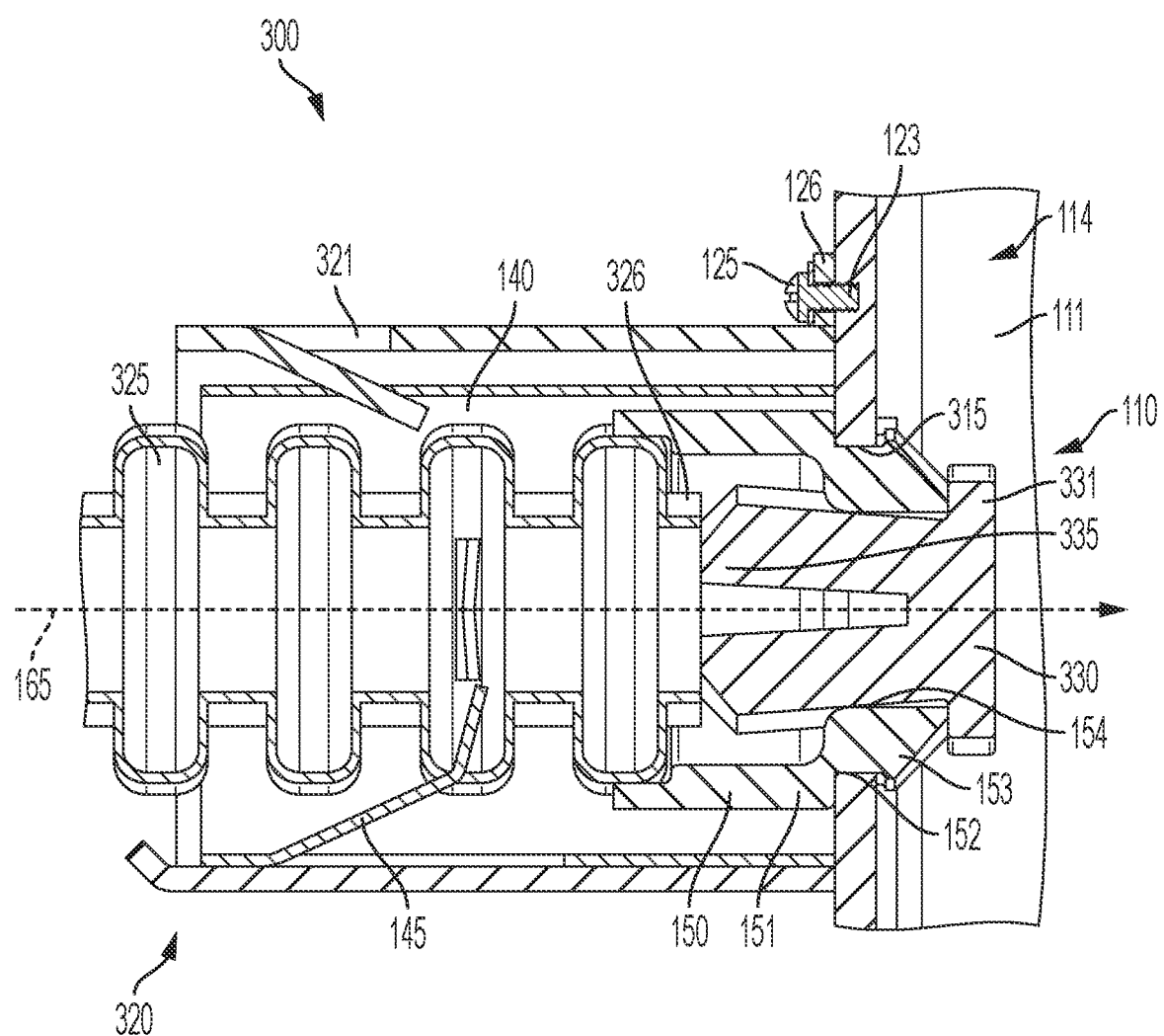
FIG. 28 is cross-sectional view of an electrical connection assembly taken along line 28-28 of FIG. 27 showing a cable connected to the electrical connector.

FIGS. 26-28 show an alternate embodiment of an electrical assembly 300 including alternate features for accommodating an alternate electrical connector 320 (shown in FIG. 27 and FIG. 28). The assembly 300 is substantially the same as the assembly 100 described above with respect to FIGS. 1-12, except for the differences discussed herein. Like reference numerals are used for like elements. As shown in FIG. 26, the electrical box 110 includes a pair of apertures 315 oriented to provide access into the internal volume 114 of the housing 111.

As shown in FIG. 27, the apertures 315 are spaced apart and configured to accommodate a larger electrical connector 320 that is configured to accommodate larger cables 325. While the term "larger" is a relative term, for exemplary purposes, the pair of apertures 315 can be spaced apart from each other a non-standard distance to accommodate a larger connector than that of apertures spaced a standard distance apart from each other. Standard can refer to a common size manufactured in view of one or more of a safety code or manufacturing guideline defining the particular parameters of a feature. Moreover, the pair of apertures 315 is described to illustrate the versatility of an electrical connector 320 of the present disclosure to accommodate a wide variety of shapes, sizes, and styles of cables. In addition to the pair of apertures 315, the electrical box 111 includes an eccentric opening 318 positioned in a third aperture 319 on a same side 312 of the electrical box 111 as the pair of apertures 315. Providing an eccentric opening 318 on the same side 312 as the pair of apertures 315 enables the electrical box 111 and connector 320 to accommodate a wide range of cables and electrical components.

FIG. 28 shows a cross-sectional view of the electrical connection assembly 300 taken along line 28-28 of FIG. 27. The electrical connector 320 includes a frame 321 with a retainer 140 having one or more teeth 145 extending radially inward from the frame 121 to clamp and grip the cable 325. The electrical insulating bushing 150 is securely seated in the aperture 315 and circumscribes the insertion path 165. As shown, the body 151 of the bushing 150 has a groove 152 and a flange 153 at a leading end. The groove 152 is dimensioned to mate with the aperture 315 with the flange positioned in the internal volume 114 of the electrical box and a trailing end of the body 151 of the bushing 150 positioned in the retainer 140 or frame 321. Once positioned, the flange 153 and groove 152 secure the bushing 150 in the aperture 315.

A plug 330 is positioned in an opening 154 of the electrical bushing 150 to obstruct the insertion path 165. The plug 330 has flange portion 331 with a larger dimension than the opening 154 of the bushing 150. The plug further includes a plurality of resilient legs 335 extending from the flange portion 331. The resilient legs 335 are oriented to flex in a radial direction relative to the insertion path 165. For example, the resilient legs 335 can be oriented to provide a structure larger than the opening 154 that flexes inward in a radial direction relative to the insertion path 165 when inserted into the opening 154. The resilient legs 335 exert a radial force to friction fit the plug 330 within the opening 154 of the bushing 150. A tool can be used to remove the plug 330 from the opening 154. Alternatively, as the cable 325 is inserted along the insertion path 165, a leading end 326 of the cable 325 can contact the plug 330 and exert a lateral force on the plug 330 that causes the resilient legs 335 to flex radially inward as the end 326 of the cable 325 pushes the plug 330 the opening until the plug 330 is displaced from the opening 154 and the insertion path 165 is not obstructed.

FIGS. 29-32 show an alternate embodiment of an electrical assembly 400 including features substantially the same as assembly 100 and assembly 300 described above, except for the differences discussed herein. Like reference numerals are used for like elements. When employed in a variety of applications, it is common to secure the electrical box 110 (shown in FIG. 1) to a structure. Such structures include, but are not limited to, studs, frames, supports, columns, braces, hardware, cabinets, cases, walls, and other structural members found in a variety of applications where an electrical box 110 is employed. The electrical assembly 400 includes one or more brackets (shown in FIG. 29 and FIG. 30) that may be used to secure the electrical box 110 to the structure.

Known electrical boxes and brackets may have limitations. For example, physical space may be limited, and the construction of the structural members to which the electrical box is secured may present physical constraints in terms of how and where the electrical box can be mounted to the structure. Additionally, bracket geometries may limit the number of electrical boxes that can be mounted to a structure, as well as how and where the electrical boxes can be mounted. Moreover, when mounting an electrical box to a structure, a user may encounter challenges with respect to proper placement (e.g., height, alignment, orientation) of the electrical box relative to the structure, relative to other electrical boxes, and relative to other components that may be found within a predetermined physical space defined by the structure, such as plumbing, insulation, electrical wiring, and additional structural support members.

Accordingly, for safe and effective distribution of electric power, brackets and electrical boxes are needed that address the above-noted limitations. The present disclosure provides an assembly for electrical distribution including an electrical box and a bracket having features that can be provided either alone or in combination to facilitate safe and effective electrical distribution while achieving advantages that cannot be obtained by known electrical boxes and brackets.

Figure 30:
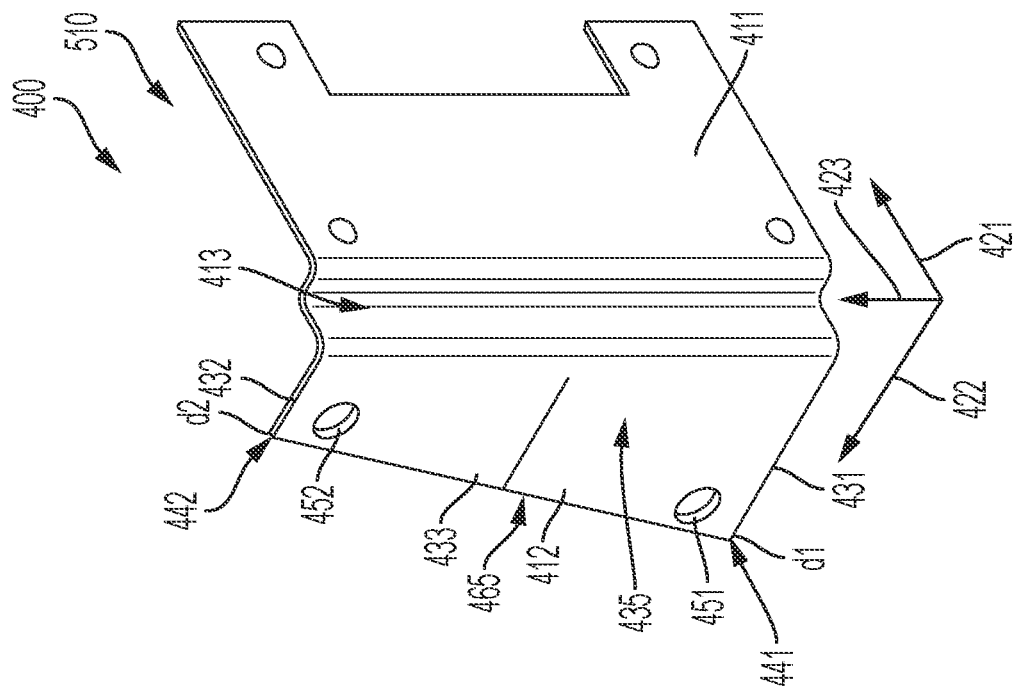
FIG. 30 is an illustration of a perspective view of another embodiment of a bracket in accordance with the disclosure.
Figure 29:
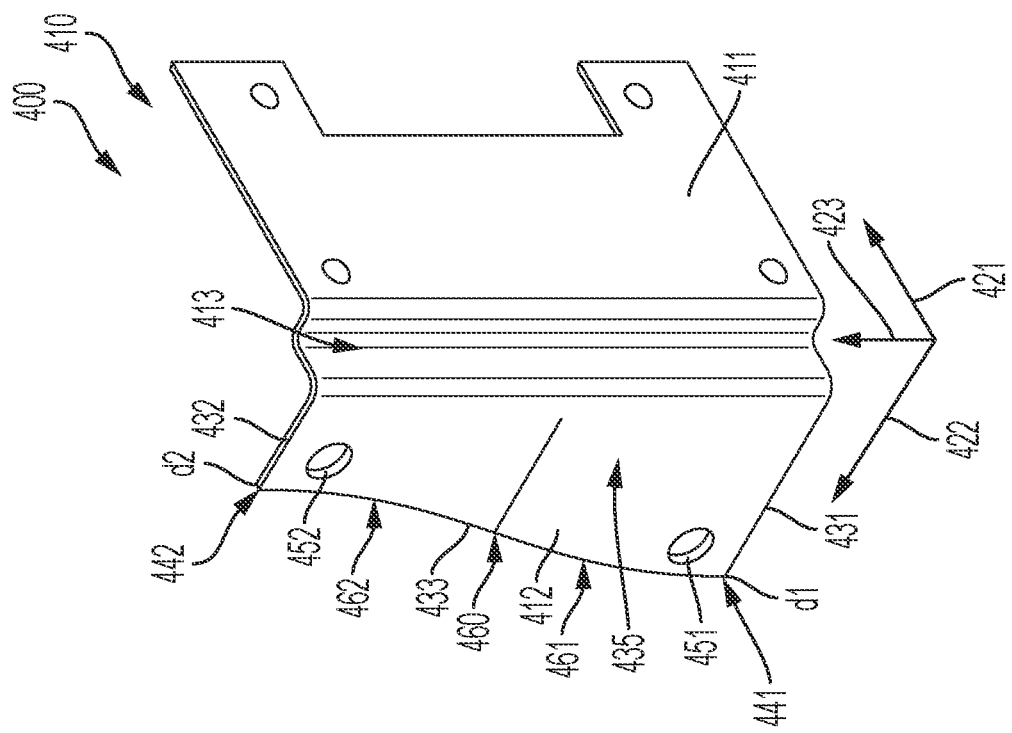
FIG. 29 is an illustration of a perspective view of an embodiment of a bracket in accordance with the disclosure.

FIG. 29 is a perspective view of one example of a bracket 410 of the electrical assembly 400, and FIG. 30 is a perspective view of another example of a bracket 510 of the electrical assembly 400. Same or similar features between bracket 410 and bracket 510 are identified using the same reference numerals. For simplicity and not limitation, features of bracket 410 will be described with the understanding that bracket 510 includes the same or similar features, unless otherwise noted.

With reference to FIG. 29, the bracket 410 includes a first flange 411 and a second flange 412. The first flange 411 is configured to be connected to the electrical box 110 (shown in FIG. 1) and the second flange 412 is configured to be connected to a structure (shown in FIG. 31). The first flange 411 can be coupled to the electrical box using one or more fasteners (e.g., screw, bolt, rivet, peg, pin, adhesive, material bonding technique, weld).

The bracket 410 includes a corner 413 connecting the first flange 411 with the second flange 412. The first flange 411 extends from the corner 413 in a first direction 421 away from the corner 413, and the second flange 412 extends from the corner 413 in a second direction 422 away from the corner 413. The first direction 421 is different from the second direction 422. In the illustrated embodiment, the first direction 421 and the second direction 422 are oriented perpendicular to each other and the corner 413 extends linearly in a third direction 423 along the joint between the first flange 411 and the second flange 412. The first direction 421, second direction, 422, and third direction 423 define a three-dimensional Cartesian coordinate system.

The bracket 410 is shown as having an inverted corner 413 configured to receive a cover (not shown) and maintain the cover flush with the second flange 412 and the open face of the electrical box 110. In other embodiments, the corner 413 can be a standard or non-inverted corner, an inverted or non-inverted rounded corner, or corner having other linear, non-linear, or polygonal shapes depending on the type of cover or particular application in which the assembly 400 is employed.

The second flange 412 includes a first edge 431, a second edge 432, and a third edge 433 that form a continuous perimeter of the second flange 412 and define a central body portion 435 of the second flange 412 within the continuous perimeter and delimited by the corner 413. The central body portion 435 is shown as a planar surface, although the central body portion 435 can include non-planar surfaces in other embodiments. The first edge 431 and the third edge 433 intersect at a first intersection 441, and the second edge 432 and the third edge 433 intersect at a second intersection 442.

The first intersection 441 is spaced a first distance "d1" from the corner 413, and the second intersection 442 is spaced a second distance "d2" from the corner 413. The first distance "d1" does not equal the second distance "d2." In the illustrated embodiment, the first distance "d1" is greater than the second distance "d2," although the second distance "d2" can be greater than the first distance "d1" is other embodiments.

The central body portion 435 includes a first aperture 451 positioned between the first edge 431 and the third edge 433 and a second aperture 452 positioned between the second edge 432 and the third edge 433. Relative to the corner 413, the first aperture 451 is spaced a greater distance from the corner 413 than the distance the second aperture 452 is spaced from the corner 413. In other embodiments, where "d2" is greater than "d1," the second aperture 452 is spaced a greater distance from the corner 413 than the distance the first aperture 451 is spaced from the corner 413. Spacing the apertures 451, 452 at offset locations within the central body 435 relative to the corner 413 may better stabilize and prevent rotation of the electrical assembly 400 than two equally spaced apertures.

As further shown in FIG. 29, the third edge 433 includes an inflection point 460 where the third edge 433 changes from a convex profile 461 to a concave profile 462. The convex profile 461 extends from the first intersection 441 to the inflection point 460, and the concave profile 462 extends from the second intersection 442 to the inflection point 460. The third edge 433 defines a continuous profile extending between the first intersection 441 and the second intersection 442. The inflection point 460 is midway between first intersection 441 and the second intersection 442, although the inflection point 460 can be located at any location along the third edge 433 in other embodiments without departing from the scope of the disclosure.

Additionally, where "d2" is greater than "d1," a concave profile can extend from the first intersection 441 to the inflection point 460, and a convex profile can extend from the second intersection 442 to the inflection point 460. Alternatively, as shown with respect to FIG. 30, the third edge 433 can extend linearly from the first intersection 441 to the second intersection 442 defining a linear profile 465 oriented at a non-parallel angle relative to the corner 413. In other embodiments (not shown), the third edge 433 can include one or more features including planar and non-planar profiles and one or more inflection points.

FIG. 31 shows a perspective view of the electrical assembly 400 including the bracket 410 of FIG. 29 attached to the electrical box 110 of FIG. 1. Although not shown, it should be understood that the bracket 510 of FIG. 30 could similarly be attached to the electrical box 110 of FIG. 1, without departing from the scope of the disclosure. The assembly 400 is mounted to a structure 610 with one or more fasteners 615 (e.g., screw, bolt, rivet, peg, pin, adhesive, material bonding technique, weld) secured within the first aperture 451 and the second aperture 452 (shown in FIG. 29). The structure 610 is illustrated as a stud 610 with the understanding that the structure 610 can include one or more studs, frames, supports, columns, braces, hardware, cabinets, cases, walls, or other structural members in other embodiments.

The bracket 410 and electrical box 110 are supplied to a technician as a completed assembly 400 with the bracket 410 fixed to the electrical box 110. Alternatively, the bracket 410 is provided alone or in combination with the electrical box 110 as a separate component that a technician fastens to the electrical box 110 to provide a completed assembly 400. The assembly 400 is mounted to the structure 610. In some embodiments, a plurality of assemblies 400 can be mounted to the structure 610. For example, in the illustrated embodiment, two assemblies 400 are mounted to the structure 610. The bracket 410 includes a marker 415 representing one or more of a location or position of the bracket 410 relative to another object (e.g., another bracket, a structure 610). The marker 415 can be a visual marker (e.g., color, paint, sticker) or a physical marker (e.g., notch, scribe, ridge).

When fastened to the electrical box 110, the first flange 411 is attached to a side of the exterior surface 112 of the housing 111 of the electrical box 110, and the second flange 412 extends away from the side at a non-parallel angle relative to the first flange 411. The first flange 411 and the second flange 412 are perpendicular to enable mounting of the assembly 400 on the structure 610 having a flat or planar surface parallel to the open face of the box 110. The second flange 412 is mounted to the structure 610 with the open face of the box 110 parallel to the second flange 412. In other embodiments, the structure 610 may include non-planar surfaces, or the assembly 400 may be mounted on a structure with the open face of the box 110 non-parallel to the second flange 412.

Figure 32:
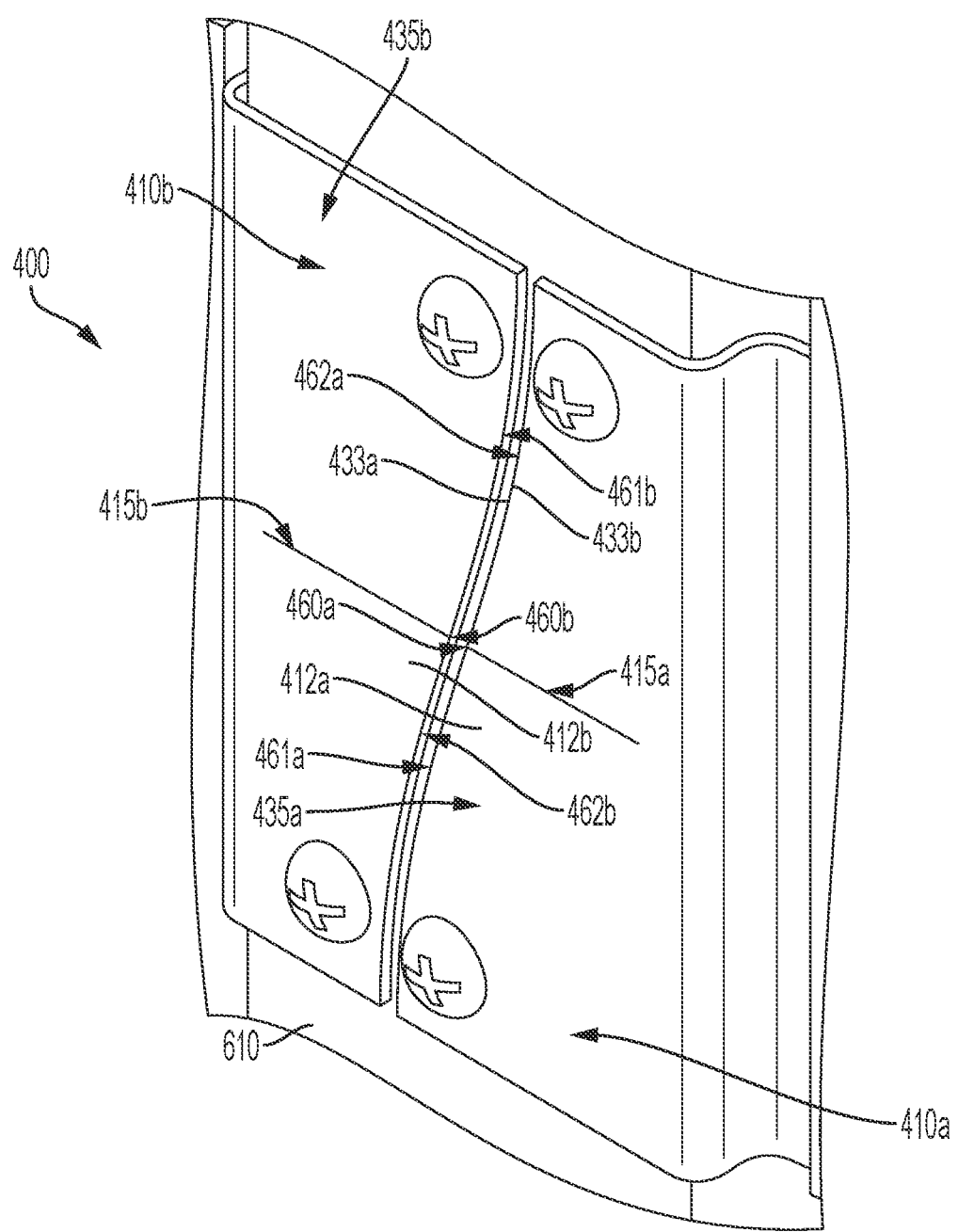
FIG. 32 shows an enlarged partial view of the brackets of FIG. 31.

FIG. 32 shows an enlarged view of a portion of the assembly 400 of FIG. 31 for better clarity. Two brackets 410a, 410b are shown. For explanation purposes, features corresponding to bracket 410a are identified as "Xa," and features corresponding to bracket 410b are identified as "Xb," where X corresponds to the reference numerals of the features described herein. As shown, when mounted side-by-side at the same elevation, the brackets 410a, 410b are structured to be positioned in mating relationship relative to each other. For example, bracket 410b is identical to bracket 410a and is oriented or rotated 180 degrees about the inflection point 460b such that the third edge 433b of bracket 410b corresponds in profile to the third edge 433a of bracket 410a to provide a complementary mating engagement between the brackets 410a, 410b.

The third edge 433a of bracket 410a mirrors the third edge 433b of bracket 410b. Inflection point 460a of bracket 410a is aligned with inflection point 460b of bracket 410b so that the convex profile 461a of bracket 410a mates with the concave profile 462b of bracket 410b, and the concave profile 462a of bracket 410a mates with the convex profile 461b of bracket 410b. This mating relationship between the third edge 433a of bracket 410a and the third edge 433b of bracket 410b provides both a structural and visual guide to a technician mounting the assembly 400 on a structure 610.

For example, in some applications, as illustrated, it may be desirable to mount at least two electrical boxes side-by-side at the same elevation. Additionally, marker 415a of bracket 410a is aligned with marker 415b of mating bracket 410b to provide the brackets 410a, 410b at the same height on the structure 610. The markers 415a, 415b are shown as scribe lines and can include other shapes such as arrows, dots, text, and detents. The brackets 410a, 410b of the present disclosure enable a technician to accomplish this objective in a reduced time and with greater accuracy and reliability than known methods using known brackets.

The brackets 410a, 410b are sized and shaped to enable placement of two brackets 410a, 410b side-by-side at the same elevation on the same structure 610. The size and shape of the brackets 410a, 410b may be predetermined and selected based on a predetermined dimension of the structure 610. For example, the size and shape of the brackets 410a, 410b may be predetermined and selected based on the dimension of a stud. The brackets 410a, 410b can be manufactured from a variety of materials (e.g., metal, plastic, polymeric) and can be a single, monolithic piece of material on which a pattern can be provided (e.g., drawn, imprinted, etched, cut, stamped, pressed, engraved) and from which the brackets 410a, 410b is formed (e.g., machined, manufactured, drawn, imprinted, etched, cut, stamped, pressed, engraved). In further embodiments, the brackets 410a, 410b can include a plurality of sheets that are mechanical attached (e.g., welded, bonded) together to provide a unitary piece on which the pattern is provided and from which the brackets 410a, 410b are formed. A variety of features (e.g., protrusions, recesses, cutouts, bends, folds, seams, apertures, notches, flanges, tabs, and slots) can be formed (e.g., machined, manufactured, drawn, imprinted, etched, cut, stamped, pressed, engraved) on the brackets 410a, 410b without departing from the scope of the disclosure.

The present disclosure provides several embodiments and features of brackets 410, 510 fixed to an electrical box 110 that facilitate and support a variety of wiring configurations and electrical components. The electrical assembly 400 achieves safe and effective distribution of electric power by mounting the electrical box 110 and the bracket 410, 510 of the present disclosure to a structure 610.

In one embodiment, an electrical connection assembly includes an electrical box including a housing having an internal surface defining an internal volume of the housing. An electrical connector is positioned outside the internal volume of the housing and fixed to the housing with a fastener. The housing includes an aperture having an opening defining an insertion path extending from a location external to the housing along a frame of the electrical connector to a location within the internal volume of the housing. The assembly includes a disc mechanically secured to the housing relative to the opening to obstruct the insertion path.

In another embodiment, a bushing for circumscribing an insertion path of an electrical connector includes a body having an opening defining a pathway along which the insertion path is configured to extend and a membrane. The membrane is mechanically coupled relative to the body to at least partially obstruct the opening.

In yet another embodiment, a method of making an electrical connector from a sheet of material includes severing the sheet according to a predetermined pattern. The method includes forming a severed segment of the sheet to provide a formed segment having a first opening and a second opening defining an insertion path extending from the first opening to the second opening along which an electrical wire is configured to extend. The method includes inserting a retainer within the formed segment, the retainer at least partially circumscribing the insertion path.

A. An electrical connection assembly includes an electrical box including a housing having an internal surface defining an internal volume of the housing. An electrical connector is positioned outside the internal volume of the housing and fixed to the housing with a fastener. The housing includes an aperture having an opening defining an insertion path extending from a location external to the housing along a frame of the electrical connector to a location within the internal volume of the housing. The assembly includes a disc mechanically secured to the housing relative to the opening to obstruct the insertion path. A retainer and a bushing including a membrane for the electrical connector as well as methods of making an electrical connector are also provided.

C1. An electrical connection assembly comprising: an electrical box including a housing having an internal surface defining an internal volume of the housing; an electrical connector positioned outside the internal volume of the housing and fixed to the housing with a fastener; the housing including an aperture having an opening defining an insertion path extending from a location external to the housing along a frame of the electrical connector to a location within the internal volume of the housing; and a disc mechanically secured to the housing relative to the opening to obstruct the insertion path.

C2. The electrical connection assembly of C1, including a retainer coupled to the frame of the electrical connector, the retainer at least partially circumscribing the insertion path.

C3. The electrical connection assembly of C2, including a bushing positioned at least partially within the retainer and circumscribing the insertion path, the bushing being manufactured from an electrical insulating material.

C4. The electrical connection assembly of C3, wherein the bushing is slidable along the insertion path from a first end of the retainer to a second end of the retainer.

C5. The electrical connection assembly of C1, including a support bracket having a first end and a second end, wherein the second end is fixed to at least one of the electrical connector and the electrical box, and wherein the first end extends cantilever from the electrical connector in a direction away from the electrical box.

C6. The electrical connection assembly of C5, including a clip mechanically coupled to the first end of the support bracket.

C7. The electrical connection assembly of C1, wherein the electrical connector is formed from a sheet of material.

C8. A bushing for circumscribing an insertion path of an electrical connector, comprising: a body having an opening defining a pathway along which the insertion path is configured to extend; and a membrane mechanically coupled relative to the body to at least partially obstruct the opening.

C9. The bushing of C8, wherein the bushing is manufactured from an electrical insulating material.

C10. The bushing of C8, wherein the membrane is mechanically coupled to the body of the bushing with a frangible attachment.

C11. The bushing of C8, wherein the membrane is manufactured from a frangible material configured to fail upon application of a predetermined stress less than a stress at which a body of the bushing fails upon application.

C12. A method of making an electrical connector from a sheet of material comprising: severing the sheet according to a predetermined pattern; forming a severed segment of the sheet to provide a formed segment having a first opening and a second opening defining an insertion path extending from the first opening to the second opening along which an electrical wire is configured to extend; and inserting a retainer within the formed segment, the retainer at least partially circumscribing the insertion path.

C13. The method of C12, including mechanically coupling a clip to a first end of the sheet after severing the sheet according to the predetermined pattern.

C14. The method of C12, including inserting a bushing within the retainer, the bushing having a body including an opening defining a pathway along which the insertion path is configured to extend, the opening circumscribing the insertion path.

C15. The method of C14, wherein the bushing is manufactured from an electrical insulating material.

C16. The method of C14, wherein the bushing comprises a membrane at least partially obstructing the opening.

C17. The method of C16, wherein the membrane is attached to the body of the bushing with a frangible attachment.

C18. The method of C12, wherein the formed segment is formed at a location of the sheet defined between a first end of the sheet and a second end of the sheet.

C19. The method of C18, wherein the sheet includes a support bracket extending from the formed segment to the first end of the sheet.

C20. The method of C18, wherein the sheet includes an aperture at a location between the formed segment and the second end of the sheet.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative system and method, and illustrative examples shown and described. Accordingly, departures may be made from such details without departing from the spirit or scope of the applicant's general inventive concept.

What is claimed is:

1. An electrical connection assembly comprising: an electrical box including a housing; an electrical connector fixed to the housing with a fastener; the housing including an aperture having an opening defining an insertion path; a disc mechanically secured to the housing relative to the opening to obstruct the insertion path; a retainer coupled to a frame of the electrical connector, the retainer at least partially circumscribing the insertion path; and a bushing positioned at least partially within the retainer and circumscribing the insertion path.

2. The electrical connection assembly of claim 1, wherein the bushing being manufactured from an electrical insulating material.

3. The electrical connection assembly of claim 1, wherein the bushing is slidable along the insertion path from a first end of the retainer to a second end of the retainer.

4. The electrical connection assembly of claim 1, including a support bracket having a first end and a second end, wherein the second end is fixed to at least one of the electrical connector and the electrical box, and wherein the first end extends cantilever from the electrical connector in a direction away from the electrical box.

5. The electrical connection assembly of claim 4, including a clip mechanically coupled to the first end of the support bracket.

6. The electrical connection assembly of claim 1, wherein the electrical connector is formed from a sheet of material.

7. A bushing for an electrical connector, comprising: a body having an opening defining a pathway along which an insertion path extends; and a membrane mechanically coupled relative to the body to at least partially obstruct the opening, wherein the membrane is mechanically coupled to the body of the bushing with a frangible attachment.

8. The bushing of claim 7, wherein the bushing is manufactured from an electrical insulating material.

9. The bushing of claim 7, wherein the membrane is manufactured from a frangible material configured to fail upon application of a predetermined stress less than a stress at which the body of the bushing fails upon application.

* * * * *